United States Patent
Kitazato et al.

(10) Patent No.: US 10,687,123 B2
(45) Date of Patent: Jun. 16, 2020

(54) TRANSMISSION APAPRATUS, TRANSMISSION METHOD, RECEPTION APPARATUS, RECEPTION METHOD, PROGRAM, AND BROADCASTING SYSTEM

(71) Applicant: Saturn Licensing LLC, New York, NY (US)

(72) Inventors: Naohisa Kitazato, Tokyo (JP); Yoshiharu Dewa, Tokyo (JP)

(73) Assignee: Saturn Licensing LLC, New York, NY (US)

( * ) Notice: Subject to any disclaimer, the term of this patent is extended or adjusted under 35 U.S.C. 154(b) by 206 days.

(21) Appl. No.: 14/529,450

(22) Filed: Oct. 31, 2014

(65) Prior Publication Data

US 2015/0046937 A1 Feb. 12, 2015

Related U.S. Application Data

(63) Continuation of application No. 13/081,566, filed on Apr. 7, 2011, now Pat. No. 8,918,801.
(Continued)

(51) Int. Cl.
*H04N 21/81* (2011.01)
*H04N 21/239* (2011.01)
(Continued)

(52) U.S. Cl.
CPC ..... *H04N 21/8166* (2013.01); *H04N 21/2393* (2013.01); *H04N 21/2402* (2013.01);
(Continued)

(58) Field of Classification Search
CPC .......... H04N 21/442; H04N 21/8166
(Continued)

(56) References Cited

U.S. PATENT DOCUMENTS 4,342,083 A 7/1982 Freedman et al.
5,315,126 A 5/1994 Field
(Continued)

FOREIGN PATENT DOCUMENTS

EP 2 514 204 10/2012
GB 2460676 A 12/2009
(Continued)

OTHER PUBLICATIONS

"Advanced Television Enhancement Forum Specification (ATVEF)," Internet Citation, Feb. 2, 1999, XP002945609 (Year: 1999).*
(Continued)

*Primary Examiner* — Jefferey F Harold
*Assistant Examiner* — Justin B Sanders
(74) *Attorney, Agent, or Firm* — Oblon, McClelland, Maier & Neustadt, L.L.P.

(57) ABSTRACT

Disclosed herein is a transmission apparatus for transmitting AV (Audio/Video) content, including: an acquirer configured to acquire an estimated number of audience terminals indicative of an estimated number of reception apparatuses receiving the AV content; a computer configured, in conjugation with the AV content, to compute, on the basis of the estimated number of audience terminals, a validity probability of trigger information associated with control of an application program to be executed in the reception apparatus; a generator configured to generate the trigger signal including the computed validity probability; and a transmitter configured to transmit the generated trigger information with the AV content.

17 Claims, 24 Drawing Sheets

Related U.S. Application Data

(60) Provisional application No. 61/378,256, filed on Aug. 30, 2010.

(51) Int. Cl.
  *H04N 21/24* (2011.01)
  *H04N 21/262* (2011.01)
  *H04N 21/6543* (2011.01)
  *H04N 21/432* (2011.01)
  *H04N 21/442* (2011.01)
  *H04N 21/47* (2011.01)

(52) U.S. Cl.
  CPC ..... *H04N 21/26208* (2013.01); *H04N 21/432* (2013.01); *H04N 21/44222* (2013.01); *H04N 21/47* (2013.01); *H04N 21/6543* (2013.01)

(58) Field of Classification Search
  USPC .......................................................... 725/14
  See application file for complete search history.

(56) References Cited

U.S. PATENT DOCUMENTS

| | | |
|---|---|---|
| 5,450,612 A | 9/1995 | Chanroo et al. |
| 5,784,557 A | 7/1998 | Oprescu |
| 5,787,483 A | 7/1998 | Jam et al. |
| 6,047,052 A | 4/2000 | Sakai et al. |
| 6,240,555 B1 | 5/2001 | Shoff et al. |
| 6,330,719 B1 | 12/2001 | Zigmond et al. |
| 6,389,034 B1 | 5/2002 | Guo et al. |
| 6,463,048 B1 | 10/2002 | Garyantes |
| 6,571,392 B1 | 5/2003 | Zigmond et al. |
| 6,604,242 B1 | 8/2003 | Weinstein et al. |
| 6,732,165 B1 | 5/2004 | Jennings, III |
| 6,750,781 B1 | 6/2004 | Kim |
| 6,965,913 B2 | 11/2005 | Levitan |
| 6,966,066 B1 | 11/2005 | Zigmond et al. |
| 7,284,202 B1 | 10/2007 | Zenith |
| 7,421,741 B2 | 9/2008 | Phillips, II et al. |
| 7,584,491 B2* | 9/2009 | Bruckner ........... H04N 7/17318 709/213 |
| 7,600,241 B2 | 10/2009 | Zigmond et al. |
| 7,676,822 B2 | 3/2010 | Forler et al. |
| 7,733,913 B1 | 6/2010 | Cheung et al. |
| 7,746,773 B2 | 6/2010 | Gerdes et al. |
| 7,783,776 B2 | 8/2010 | Nimour |
| 7,889,964 B1 | 2/2011 | Barton et al. |
| 7,912,975 B2 | 3/2011 | Grossner et al. |
| 8,072,950 B2 | 12/2011 | Fan et al. |
| 8,196,165 B2 | 6/2012 | Schlack |
| 8,266,644 B2 | 9/2012 | Randolph et al. |
| 8,595,783 B2 | 11/2013 | Dewa |
| 8,601,089 B2 | 12/2013 | Bowman et al. |
| 8,705,933 B2 | 4/2014 | Eyer |
| 8,839,338 B2 | 9/2014 | Eyer |
| 8,842,974 B2 | 9/2014 | Kitazato |
| 8,863,171 B2 | 10/2014 | Blanchard et al. |
| 8,893,210 B2 | 11/2014 | Eyer |
| 2002/0062483 A1 | 5/2002 | Ishizaki et al. |
| 2002/0162118 A1 | 10/2002 | Levy et al. |
| 2003/0018745 A1 | 1/2003 | McGowan et al. |
| 2003/0037132 A1* | 2/2003 | Abdollahi ........... H04B 7/18523 709/223 |
| 2004/0022278 A1 | 2/2004 | Thomas et al. |
| 2004/0031058 A1 | 2/2004 | Reisman |
| 2004/0068570 A1* | 4/2004 | Haller ................. G06Q 20/201 709/228 |
| 2004/0111756 A1* | 6/2004 | Stuckman ............. H04N 5/782 725/142 |
| 2004/0139475 A1 | 7/2004 | Zenoni |
| 2004/0234018 A1 | 11/2004 | Ram et al. |
| 2005/0015796 A1 | 1/2005 | Bruckner et al. |
| 2005/0138667 A1 | 6/2005 | Delpuch |
| 2005/0148296 A1 | 7/2005 | Kopra et al. |
| 2005/0262539 A1 | 11/2005 | Barton et al. |
| 2005/0273832 A1 | 12/2005 | Zigmond et al. |
| 2005/0278747 A1 | 12/2005 | Barton et al. |
| 2006/0010470 A1* | 1/2006 | Kurosaki ............... H04H 20/76 725/46 |
| 2006/0026162 A1 | 2/2006 | Salmonsen et al. |
| 2006/0031249 A1 | 2/2006 | Peden et al. |
| 2006/0242692 A1 | 10/2006 | Thione et al. |
| 2007/0028261 A1* | 2/2007 | Bouilloux-Lafont ....... G06Q 30/02 725/32 |
| 2007/0061724 A1 | 3/2007 | Slothouber et al. |
| 2008/0082922 A1 | 4/2008 | Biniak et al. |
| 2008/0126477 A1 | 5/2008 | Kim |
| 2008/0133728 A1 | 6/2008 | Nimour |
| 2008/0151749 A1* | 6/2008 | Kawamura ........... H04L 67/325 370/230 |
| 2008/0165865 A1 | 7/2008 | Bar-Ness et al. |
| 2008/0172585 A1 | 7/2008 | Hurley |
| 2008/0247543 A1 | 10/2008 | Mick et al. |
| 2009/0103501 A1 | 4/2009 | Farrag et al. |
| 2009/0158315 A1 | 6/2009 | Bendall et al. |
| 2009/0320066 A1* | 12/2009 | Soldan ................... H04N 5/765 725/37 |
| 2010/0080529 A1 | 4/2010 | Barton et al. |
| 2010/0153994 A1 | 6/2010 | Alexander |
| 2010/0180007 A1 | 7/2010 | Suh et al. |
| 2011/0088075 A1 | 4/2011 | Eyer |
| 2011/0126107 A1 | 5/2011 | Barton et al. |
| 2011/0135276 A1 | 6/2011 | Barton et al. |
| 2011/0200300 A1 | 8/2011 | Barton et al. |
| 2011/0243536 A1 | 10/2011 | Eyer |
| 2011/0246488 A1 | 10/2011 | Eyer |
| 2011/0247028 A1 | 10/2011 | Eyer |
| 2011/0298981 A1 | 12/2011 | Eyer |
| 2011/0299827 A1 | 12/2011 | Eyer |
| 2011/0302599 A1 | 12/2011 | Eyer |
| 2011/0302611 A1 | 12/2011 | Eyer |
| 2012/0011550 A1* | 1/2012 | Holland ............... H04N 21/4126 725/78 |
| 2012/0027383 A1 | 2/2012 | Barton et al. |
| 2012/0044418 A1 | 2/2012 | Eyer |
| 2012/0047531 A1 | 2/2012 | Eyer |
| 2012/0050619 A1 | 3/2012 | Kitazato et al. |
| 2012/0050620 A1 | 3/2012 | Kitazato |
| 2012/0054214 A1 | 3/2012 | Yamagishi et al. |
| 2012/0054235 A1 | 3/2012 | Kitazato et al. |
| 2012/0054267 A1 | 3/2012 | Yamagishi et al. |
| 2012/0054268 A1 | 3/2012 | Yamagishi |
| 2012/0054783 A1 | 3/2012 | Yamagishi |
| 2012/0054784 A1 | 3/2012 | Kitazato et al. |
| 2012/0060197 A1 | 3/2012 | Kitahara et al. |
| 2012/0063508 A1 | 3/2012 | Hattori et al. |
| 2012/0072965 A1 | 3/2012 | Dewa |
| 2012/0081508 A1 | 4/2012 | Kitazato |
| 2012/0081607 A1 | 4/2012 | Kitazato |
| 2012/0082266 A1 | 4/2012 | Kitazato et al. |
| 2012/0084802 A1 | 4/2012 | Kitazato |
| 2012/0084824 A1 | 4/2012 | Kitazato |
| 2012/0084829 A1 | 4/2012 | Kitazato |
| 2012/0114301 A1 | 5/2012 | Barton et al. |
| 2012/0185888 A1 | 7/2012 | Eyer et al. |
| 2012/0213494 A1 | 8/2012 | Barton et al. |
| 2012/0253826 A1 | 10/2012 | Kitazato et al. |
| 2012/0274848 A1 | 11/2012 | Kitahara et al. |
| 2012/0275764 A1 | 11/2012 | Eyer |
| 2013/0024894 A1 | 1/2013 | Eyer |
| 2013/0024897 A1 | 1/2013 | Eyer |
| 2013/0031569 A1 | 1/2013 | Eyer |
| 2013/0036440 A1 | 2/2013 | Eyer |
| 2013/0055313 A1 | 2/2013 | Eyer |
| 2013/0103716 A1 | 4/2013 | Yamagishi |
| 2013/0145414 A1 | 6/2013 | Yamagishi |
| 2013/0167171 A1 | 6/2013 | Kitazato et al. |
| 2013/0191860 A1 | 7/2013 | Kitazato et al. |
| 2013/0198768 A1 | 8/2013 | Kitazato |
| 2013/0201399 A1 | 8/2013 | Kitazato et al. |
| 2013/0205327 A1 | 8/2013 | Eyer |
| 2013/0212634 A1 | 8/2013 | Kitazato |

(56) References Cited

U.S. PATENT DOCUMENTS

| | | |
|---|---|---|
| 2013/0215327 A1 | 8/2013 | Kitazato et al. |
| 2013/0243393 A1 | 9/2013 | Barton et al. |
| 2013/0250173 A1 | 9/2013 | Eyer |
| 2013/0254824 A1 | 9/2013 | Eyer |
| 2013/0282870 A1 | 10/2013 | Dewa et al. |
| 2013/0283311 A1 | 10/2013 | Eyer |
| 2013/0283328 A1 | 10/2013 | Kitazato |
| 2013/0291022 A1 | 10/2013 | Ever |
| 2013/0291049 A1 | 10/2013 | Kitazato |
| 2013/0340007 A1 | 12/2013 | Eyer |
| 2014/0013347 A1 | 1/2014 | Yamagishi |
| 2014/0013379 A1 | 1/2014 | Kitazato et al. |
| 2014/0020038 A1 | 1/2014 | Dewa |
| 2014/0020042 A1 | 1/2014 | Eyer |
| 2014/0040965 A1 | 2/2014 | Kitazato et al. |
| 2014/0040968 A1 | 2/2014 | Kitazato et al. |
| 2014/0043540 A1 | 2/2014 | Kitazato et al. |
| 2014/0053174 A1 | 2/2014 | Eyer et al. |
| 2014/0067922 A1 | 3/2014 | Yamagishi et al. |
| 2014/0099078 A1 | 4/2014 | Kitahara et al. |
| 2014/0122528 A1 | 5/2014 | Yamagishi |
| 2014/0137153 A1 | 5/2014 | Fay et al. |
| 2014/0137165 A1 | 5/2014 | Yamagishi |
| 2014/0150040 A1 | 5/2014 | Kitahara et al. |
| 2014/0157304 A1 | 6/2014 | Fay et al. |
| 2014/0173661 A1 | 6/2014 | Yamagishi |
| 2014/0186008 A1 | 7/2014 | Eyer |
| 2014/0208375 A1 | 7/2014 | Fay et al. |
| 2014/0208380 A1 | 7/2014 | Fay et al. |
| 2014/0229580 A1 | 8/2014 | Yamagishi |
| 2014/0229979 A1 | 8/2014 | Kitazato et al. |
| 2014/0253683 A1 | 9/2014 | Ever et al. |

FOREIGN PATENT DOCUMENTS

| | | | |
|---|---|---|---|
| JP | 11-155141 | 6/1999 | |
| JP | 2005-12545 | 1/2005 | |
| JP | 2006-050237 | 2/2006 | |
| JP | 2006-109218 | 4/2006 | |
| JP | 2006113698 A * | 4/2006 | ............. G06F 13/00 |
| JP | 2007-521769 | 8/2007 | |
| JP | 2008-529373 | 7/2008 | |
| WO | WO 01/01232 A1 | 1/2001 | |
| WO | WO 02/45406 A2 | 6/2002 | |
| WO | WO 02/45406 A3 | 6/2002 | |
| WO | 2006/015186 | 2/2006 | |
| WO | WO 2009/057050 A2 | 5/2009 | |

OTHER PUBLICATIONS

Korean Office Action dated Jul. 20, 2017 in Patent Application No. 10-2013-7004231 (with English Translation).

Office Action dated Jun. 27, 2013, in Korean Patent Application No. 10-2011-7008528 (with English translation).

Combined Office Action and Search Report dated Aug. 14, 2015, in Chinese Patent Application No. 201180038958.4 (with English translation).

International Search Report and Written Opinion dated May 20, 2011 in PCT/US2011/029055.

European Office Action dated Jan. 27, 2016, in Patent Application No. 11818492.8.

European Office Action dated Apr. 24, 2015, in Patent Application No. 11 818 492.8.

Extended European Search Report dated Feb. 3, 2014 in Patent Application No. 11818492.8.

Albrecht, "TV Multi-Taskers Can Get Jacked", The GigaOm Network, Mar. 15, 2008, 6 pages.

Verizon, "Verizon Ushers in a New Era of Television Entertainment With the Debut of FIOS TV in Allentown, PA", Verizon PR Newswire, Nov. 4, 2009, 4 pages.

Freeman, "Implementing the ATSC PSIP Standard", Softprose Inc., Oct. 26, 2006, 17 pages.

Huang et al., "Performance Analysis of Data Placement and Retrieval Schemes for Video Servers Based on Response Time Guaranteed", IEEE Explore, Sep, 1997, 1 page.

Schuk, "Roundbox's Mobile DTV Widgets Marry Mobile TV, Web", Broadcast Engineering, May 5, 2009, 3 pages.

Soares, "Interactive Television in Brazil: System Software and the Digital Divide", Telemidia Lab Catholic University of Rio de Janeiro, 2007, 3 pages.

Anonymous, "TiVo Series3 HD DVR (32 HD Hours) Product Summary", CNET Editor's Review, Sep. 11, 2006 (Updated Sep. 4, 2008), 10 pages.

Verizon, "Verizon Launches New Wave of Interactive Features for FIOS TV Customers in North Texas", Verizon News Release, Oct. 24, 2008, 4 pages.

Williams et al., "Virtual Personalised Channels: Video Conducting of Future TV Broadcasting", EWIMT 2005: Second European Workshop on the Integration of Knowledge, Semantic and Digital Media Technologies, Nov. 30-Dec. 1, 2005, 2 pages.

U.S. Appl. No. 13/216,375, filed Aug. 24, 2011, 2012-0063508, Hattori, et al.

U.S. Appl. No. 13/107,604, filed May 13, 2011, 2012-0072965, Dewa.

U.S. Appl. No. 13/238,080, filed Sep. 21, 2011, 2012-0082266, Kitazato, et al.

U.S. Appl. No. 13/212,972, filed Aug. 18, 2011, 2012-0050620, Kitazato.

U.S. Appl. No. 13/220,231, filed Aug. 29, 2011, 2012-0060197, Kitahara, et al.

U.S. Appl. No. 13/081,566, filed Apr. 7, 2011, 2012-0054784, Kitazato, et al.

U.S. Appl. No. 13/038,939, filed Mar. 2, 2011, 2011-0302599, Eyer.

U.S. Appl. No. 12/985,241, filed Jan. 5, 2011, 2011-0243536, Eyer.

U.S. Appl. No. 13/043,170, filed Mar. 8, 2011, 2012-0047531, Eyer.

U.S. Appl. No. 13/041,743, filed Mar. 7, 2011, 2012-0044418, Eyer.

U.S. Appl. No. 13/039,005, filed Mar. 2, 2011, 2011-0299827, Eyer.

U.S. Appl. No. 13/071,560, filed Mar. 25, 2011, 2012-0054268, Yamagishi.

U.S. Appl. No. 13/071,559, filed Mar. 25, 2011, 2012-0054267, Yamagishi, et al.

U.S. Appl. No. 13/071,238, filed Mar. 24, 2011, 2012-0054783, Yamagishi.

U.S. Appl. No. 13/075,440, filed Mar. 30, 2011, 2012-0054214, Yamagishi, et al.

U.S. Appl. No. 13/046,579, filed Mar. 11, 2011, 2011-0247028, Eyer.

U.S. Appl. No. 13/206,627, filed Aug. 10, 2011, 2012-0084802, Kitazato.

U.S. Appl. No. 13/238,065, filed Sep. 21, 2011, 2012-0081607, Kitazato.

U.S. Appl. No. 12/942,835, filed Nov. 9, 2010, 2011-0246488, Eyer.

U.S. Appl. No. 13/009,720, filed Jan. 19, 2011, 2012-0185888, Eyer, et al.

U.S. Appl. No. 13/304,126, filed Nov. 23, 2011, 2012-0275764, Eyer.

U.S. Appl. No. 13/080,866, filed Apr. 6, 2011, 2012-0054235, Kitazato, et al.

U.S. Appl. No. 13/071,551, filed Mar. 25, 2011, 2012-0050619, Kitazato, et al.

U.S. Appl. No. 13/239,871, filed Sep. 22, 2011, 2012-0084824, Kitazato.

U.S. Appl. No. 13/238,138, filed Sep. 21, 2011, 2012-0084829, Kitazato.

U.S. Appl. No. 13/238,277, filed Sep. 21, 2011, 2012-0081508, Kitazato.

U.S. Appl. No. 12/798,118, filed Mar. 30, 2010, 2011-0088075, Eyer.

U.S. Appl. No. 13/038,984, filed Mar. 2, 2011, 2011-0298981, Eyer.

U.S. Appl. No. 13/038,967, filed Mar. 2, 2011, 2011-0302611, Eyer.

U.S. Appl. No. 13/422,203, filed Mar. 16, 2012, 2012-0253826, Kitazato, et al.

U.S. Appl. No. 13/452,376, filed Apr. 20, 2012, 2012-0274848, Kitaiiara, et al.

U.S. Appl. No. 13/562,946, filed Jul. 31, 2012, 2013-0055313, Eyer.

(56) References Cited

OTHER PUBLICATIONS

U.S. Appl. No. 13/559,166, filed Jul. 26, 2012, 2013-0036440, Eyer.
U.S. Appl. No. 13/490,216, filed Jun. 6, 2012, 2013-0024894, Eyer.
U.S. Appl. No. 13/554,688, filed Jul. 20, 2012, 2013-0031569, Eyer.
U.S. Appl. No. 13/559,188, filed Jul. 26, 2012, 2013-0198768, Kitazato.
U.S. Appl. No. 13/527,435, filed Jun. 19, 2012, 2013-0024897, Eyer.
U.S. Appl. No. 13/587,975, filed Aug. 17, 2012, 2013-0212634, Kitazato.
U.S. Appl. No. 13/593,554, filed Aug. 24, 2012, 2013-0215327, Kitazato et al.
U.S. Appl. No. 13/648,753, filed Oct. 10, 2012, 2013-0103716, Yamagishi.
U.S. Appl. No. 13/679,624, filed Nov. 16, 2012, 2013-0145414, Yamagishi.
U.S. Appl. No. 13/708,313, filed Dec. 7, 2012, 2013-0167171, Kitazato et al.
U.S. Appl. No. 13/741,863, filed Jan. 15, 2013, 2013-0191860, Kitazato et al.
U.S. Appl. No. 13/753,591, filed Jan. 30, 2013, 2013-0201399, Kitazato et al.
U.S. Appl. No. 13/777,429, filed Feb. 26, 2013, 2014-0043540, Kitazato et al.
U.S. Appl. No. 13/777,693, filed Feb. 26, 2013, 2014-0040965, Kitazato et al.
U.S. Appl. No. 13/777,734, filed Feb. 26, 2013, 2014-0013379, Kitazato et al.
U.S. Appl. No. 13/782,694, filed Mar. 1, 2013, 2013-0254824, Eyer.
U.S. Appl. No. 13/782,730, filed Mar. 1, 2013, 2013-0283311, Eyer.
U.S. Appl. No. 13/800,818, filed Mar. 13, 2013, 2013-0250173, Eyer.
U.S. Appl. No. 13/841,343, filed Mar. 15, 2013, 2013-0205327, Eyer.
U.S. Appl. No. 13/846,282, filed Mar. 18, 2013, 2013-0282870, Dewa et al.
U.S. Appl. No. 13/846,247, filed Mar. 18, 2013, 2014-0040968, Kitazato et al.
U.S. Appl. No. 13/888,865, filed May 7, 2013, 2014-0099078, Kitahara et al.
U.S. Appl. No. 13/894,779, filed May 15, 2013, 2014-0122528, Yamagishi.
U.S. Appl. No. 13/905,721, filed May 30, 2013, 2014-0150040, Kitahara et al.
U.S. Appl. No. 13/915,664, filed Jun. 12, 2013, 2013-0340007, Eyer.
U.S. Appl. No. 13/930,814, filed Jun. 28, 2013, Fay.
U.S. Appl. No. 13/930,880, filed Jun. 28, 2013, Fay et al.
U.S. Appl. No. 13/924,907, filed Jun. 24, 2013, 2013-0291022, Eyer.
U.S. Appl. No. 13/997,844, filed Jun. 25, 2013, 2013-0283328, Kitazato.
U.S. Appl. No. 13/927,667, filed Jun. 26, 2013, 2014-0229580, Yamagishi.
U.S. Appl. No. 13/934,581, filed Jul. 3, 2013, 2014-0020042, Eyer.
U.S. Appl. No. 13/934,549, filed Jul. 3, 2013, Fay et al.
U.S. Appl. No. 13/934,615, filed Jul. 3, 2013, Eyer.
U.S. Appl. No. 13/934,924, filed Jul. 3, 2013, 2014-0137165, Yamagishi.
U.S. Appl. No. 13/934,473, filed Jul. 3, 2013, 2014-0173661, Yamagishi.
U.S. Appl. No. 13/955,130, filed Jul. 31, 2013, Fay.
U.S. Appl. No. 13/963,138, filed Aug. 9, 2013, 2014-0157304, Fay et al.
U.S. Appl. No. 13/963,111, filed Aug. 9, 2013, 2014-0137153, Fay et al.
U.S. Appl. No. 13/968,035, filed Aug. 15, 2013, 2014-0053174, Eyer et al.
U.S. Appl. No. 14/025,310, filed Sep. 12, 2013, 2014-0020038, Dewa.
U.S. Appl. No. 14/026,551, filed Sep. 13, 2013, 2014-0013347, Yamagishi.
U.S. Appl. No. 13/976,257, filed Jun. 26, 2013, 2013-0291049, Kitazato.
U.S. Appl. No. 14/046,543, filed Oct. 4, 2013, 2014-0208380, Fay et al.
U.S. Appl. No. 14/046,566, filed Oct. 4, 2013, 2014-0208375, Fay et al.
U.S. Appl. No. 14/069,032, filed Oct. 31, 2013, 2014-0067922, Yamagishi.
U.S. Appl. No. 14/196,432, filed Mar. 4, 2014, 2014-0186008, Eyer.
U.S. Appl. No. 14/253,474, filed Apr. 15, 2014, 2014-0229979, Kitazato et al.
U.S. Appl. No. 14/275,231, filed May 12, 2014, Eyer.
U.S. Appl. No. 14/282,572, filed May 20, 2014, 2014-0253683, Eyer et al.
U.S. Appl. No. 14/295,695, filed Jun. 4, 2014, Eyer.
U.S. Appl. No. 14/457,290, filed Aug. 12, 2014, Eyer.
U.S. Appl. No. 14/458,310, filed Aug. 13, 2014, Eyer.
U.S. Appl. No. 14/490,263, filed Sep. 18, 2014, Blanchard et al.
U.S. Appl. No. 14/493,661, filed Sep. 23, 2014, Yamagishi.
U.S. Appl. No. 14/493,721, filed Sep. 23, 2014, Kitazato.
U.S. Appl. No. 14/504,455, filed Oct. 2, 2014, Fay.
U.S. Appl. No. 14/504,984, filed Oct. 2, 2014, Eyer.
U.S. Appl. No. 14/509,200, filed Oct. 8, 2014, Eyer.
U.S. Appl. No. 14/509,166, filed Oct. 8, 2014, Kitazato.
U.S. Appl. No. 14/512,761, filed Oct. 13, 2014, Fay.
U.S. Appl. No. 14/512,776, filed Oct. 13, 2014, Kitazato.
U.S. Appl. No. 14/521,034, filed Oct. 22, 2014, Eyer.
International Search Report dated Sep. 13, 2011 in PCT/JP2011/068833 (with English translation).
Extended European Search Report dated Mar. 5, 2014 in European Patent Application No. 11821581.3.
Steven Morris et al., "Interactive TV Standards: A Guide to MHP, OCAP, and JavaTV (Chapters 3 and 4)", Interactive TV Standards, XP-002394425, Jan. 1, 2005, pp. 41-88.

* cited by examiner

TWO-DIMENSIONAL BARCODE
→TRIGGER INFORMATION

FIG. 7

Trigger with "Pre-cache" Command

| Item | No of Bits | explanation |
|---|---|---|
| Trigger_id | 8 | Idntify Trigger with same function. |
| Protocol_verion | 8 | Set to 0 currently |
| Command_code | 8 | In this case, it indicates "pre-cache" command. |
| Trigger_validity | 8 | The reciprocal of this integer value shows probability this trigger shall be treated as valid. |
| App_id | 24 | Application identifier this command target |
| App_type | 4 | Application type (for example HTML5) |
| App_url | 32 | Location of application content if the application content exists on a server |
| Broadcast_App_flag | 1 | Set when Application content exists on broadcast stream |
| Downloaded_App_flag | 1 | Set when Application content can exist on the local storage (NRT service sent it) |
| Internet_App_flag | 1 | Set when Application content exists on a server |

FIG. 8

Trigger with "Execute" Command

| Item | No of Bits | explanation |
|---|---|---|
| Trigger_id | 8 | Idntify Trigger with same function. |
| Protocol_verion | 8 | Set to 0 currently |
| Command_code | 8 | In this case, it indicates "execute" command. |
| Trigger_validity | 8 | The reciprocal of this integer value shows probability this trigger shall be treated as valid. |
| App_id | 24 | Application identifier this command target |
| App_type | 4 | Application type (for example HTML5) |
| App_url | 32 | Location of application content if the application content exists on a server |
| Broadcast_App_flag | 1 | Set when Application content exists on broadcast stream |
| Downloaded_App_flag | 1 | Set when Application content can exist on the local storage (NRT service sent it) |
| Internet_App_flag | 1 | Set when Application content exists on a server |
| App_life_scope | 2 | 0: ES bound      1: service bound<br>2: Provider bound    3: Un-bound |
| App_expire_date | 32 | Passing over it, Application shall be terminated if Terminated Command is not issued. |

FIG. 9

Trigger with "Inject_event" command

| Item | No of Bits | explanation |
|---|---|---|
| Trigger_id | 8 | Idntify Trigger with same function. |
| Protocol_version | 8 | Set to 0 currently |
| Command_code | 8 | In this case, it indicates "inject event" command. |
| Trigger_validity | 8 | The reciprocal of this integer value shows probability this trigger shall be treated as valid. |
| App_id | 24 | Application identifier this command target |
| App_type | 4 | Application type (for example HTML5) |
| Event_id | 8 | The corresponding event which described in script of the targeted Application shall be fired immediately. |
| Event Embedded Data | N | It is free format data injected into Application along with event. |

FIG. 10

Trigger with "Suspend" Command

| Item | No of Bits | explanation |
|---|---|---|
| Trigger_id | 8 | Idntify Trigger with same function. |
| Protocol_verion | 8 | Set to 0 currently |
| Command_code | 8 | In this case, it indicates "Suspend" command. |
| Trigger_validity | 8 | The reciprocal of this integer value shows probability this trigger shall be treated as valid. |
| App_id | 24 | Application identifier this command target |
| App_type | 4 | Application type (for example HTML5) |

FIG.11

Trigger with "Terminate" Command

| Item | No of Bits | explanation |
|---|---|---|
| Trigger_id | 8 | Idntify Trigger with same function. |
| Protocol_verion | 8 | Set to 0 currently |
| Command_code | 8 | In this case, it indicates "Terminate" command. |
| Trigger_validity | 8 | The reciprocal of this integer value shows probability this trigger shall be treated as valid. |
| App_id | 13 | Application identifier this command target |
| App_type | 4 | Application type (for example HTML5) |

FIG.12

| Syntax | No. Bits | Format |
|---|---|---|
| Trigger_Info_data() { | | |
|    trigger_id | 8 | uimsbf |
|    protocol_version | 8 | uimsbf |
|    command_code | 8 | uimsbf |
|    trigger_validity | 8 | uimsbf |
|    App_id | 24 | uimsbf |
|    App_type | 4 | uimsbf |
|    App_url | 32 | |
|    if(command_code==1) { | | (pre-cache) |
|       broadcast_App_flag | 1 | uimsbf |
|       downloaded_App_flag | 1 | uimsbf |
|       internet_App_flag | 1 | uimsbf |
|       reserved | 1 | "1" |
|    } | | |
|    if(coomand_code==2) { | | (execute) |
|       broadcast_App_flag | 1 | uimsbf |
|       downloaded_App_flag | 1 | uimsbf |
|       internet_App_flag | 1 | uimsbf |
|       App_life_scope | 2 | uimsbf |
|       App_expire_date | 32 | bslbf |
|    } | | |
|    if(command_code==3) { | | (inject event) |
|       reserved | 4 | "1111" |
|       event_id | 16 | uimsbf |
|       event_embedded_data_length | 8 | uimsbf |
|       for(i=0; i<N; i++) { | | |
|          event_embedded_data_byte | 8×N | bslbsf |
|       } | | |
|    } | | |
|    if(coomand_code==4 \|\| coomand_code==5) { | | (suspend/ terminate) |
|       reserved | 4 | "1111" |
|    } | | |
| } | | |

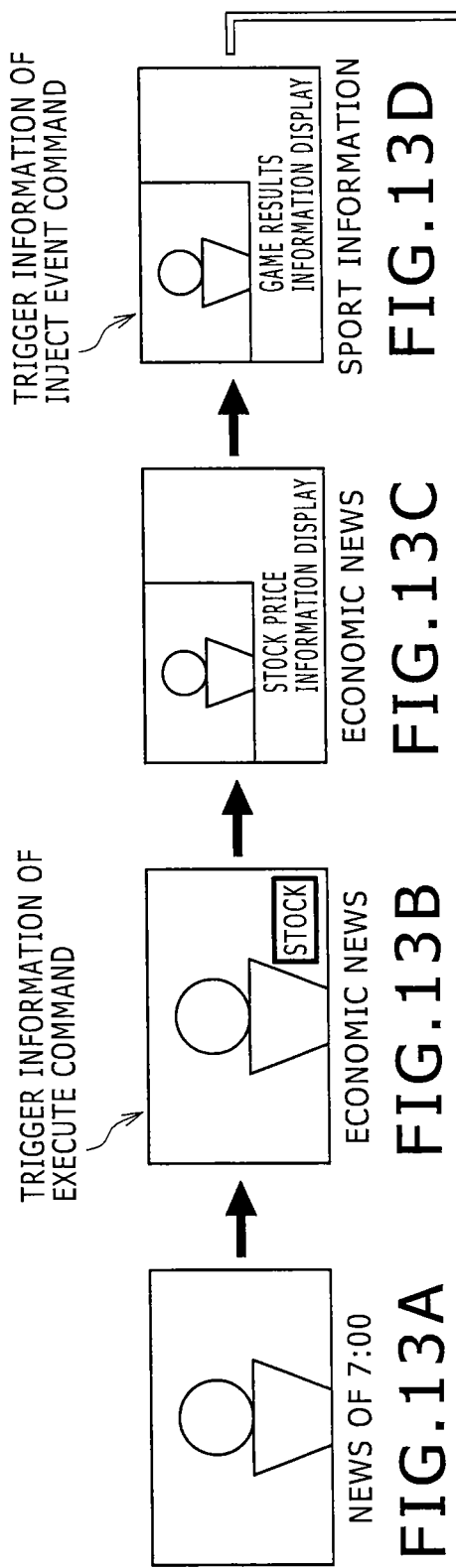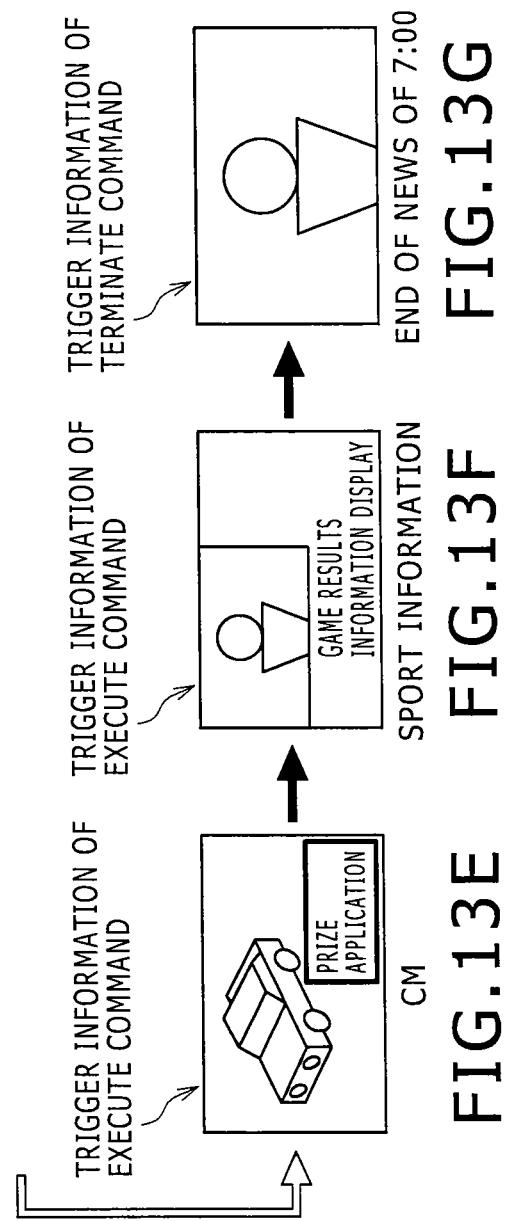

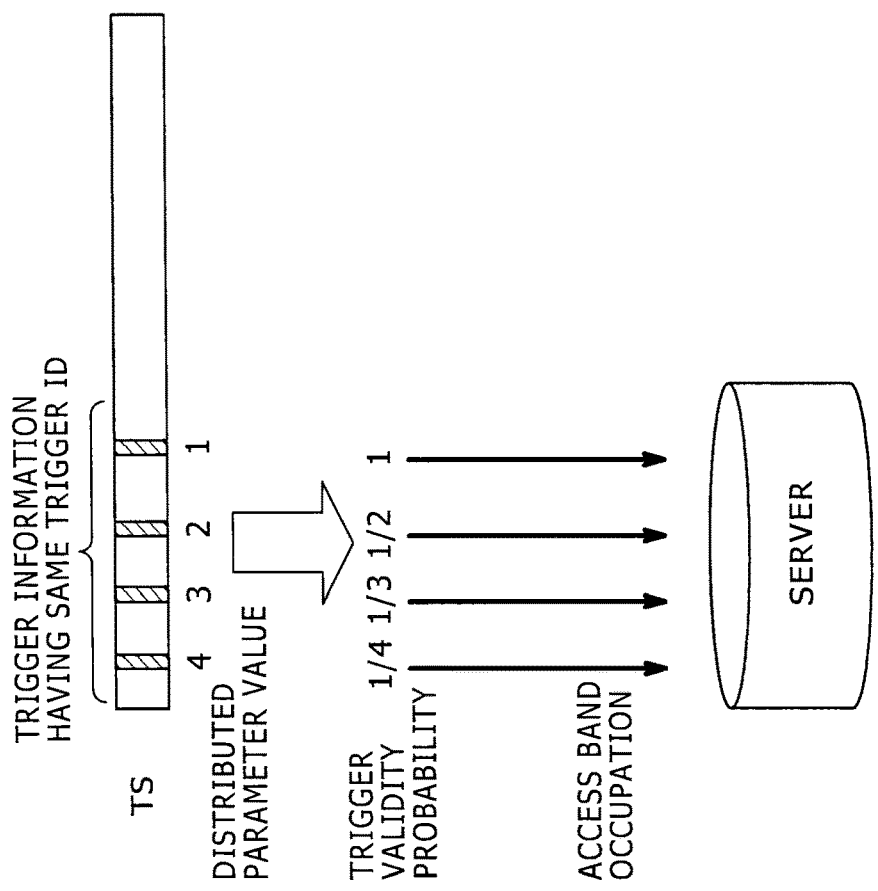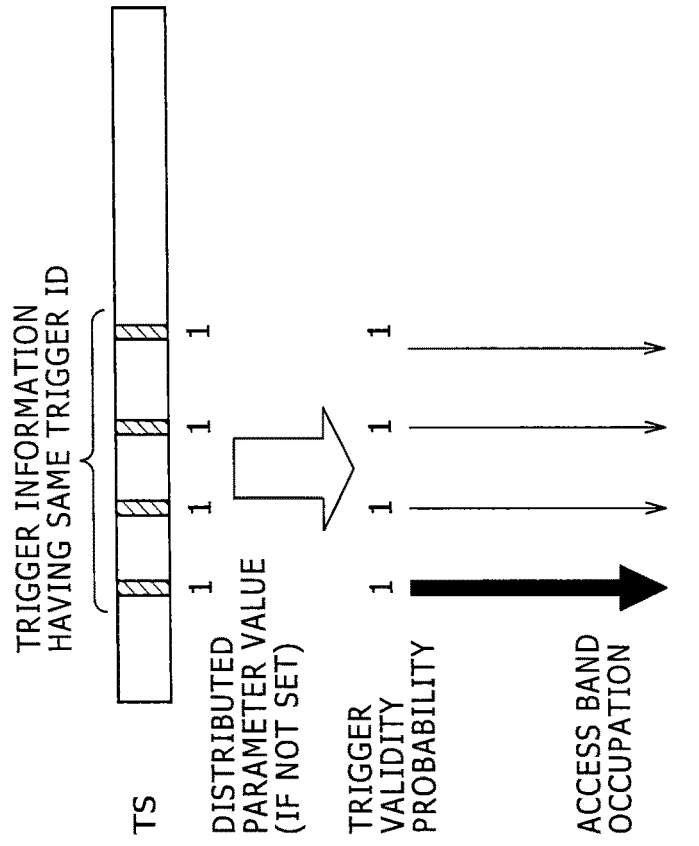

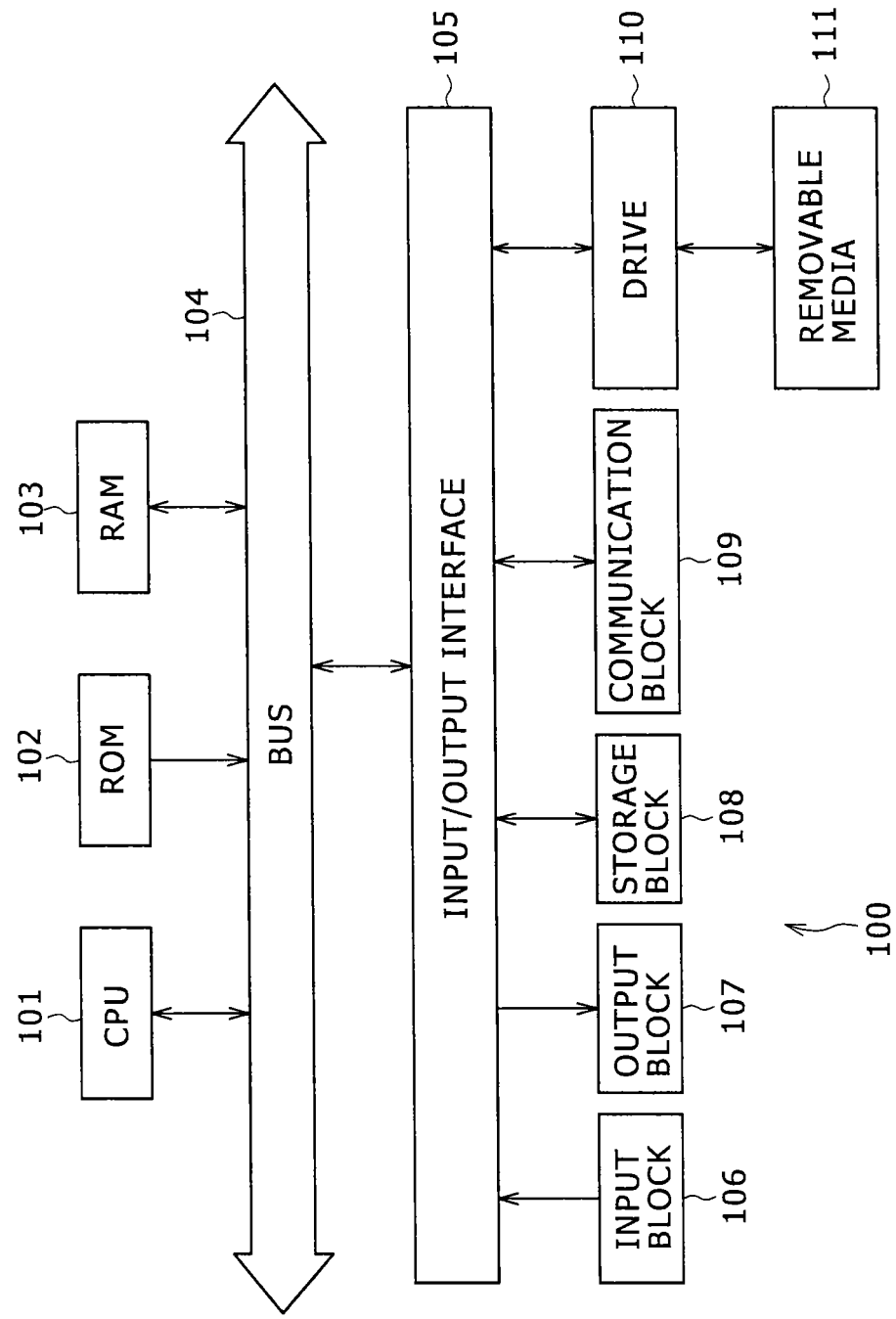

TRANSMISSION APAPRATUS, TRANSMISSION METHOD, RECEPTION APPARATUS, RECEPTION METHOD, PROGRAM, AND BROADCASTING SYSTEM

CROSS REFERENCE TO RELATED APPLICATION

This application is a continuation for U.S. patent application Ser. No. 13/081,566, filed Apr. 7, 2011, which claims the benefit of priority of Provisional Application Ser. No. 61/378,256, filed Aug. 30, 2010, the entire contents of which are incorporated herein by reference.

BACKGROUND OF THE INVENTION

1. Field of the Invention

The present invention relates to a transmission apparatus, a transmission method, a reception apparatus, reception method, a program, and a broadcasting system and, more particularly, to a transmission apparatus, a transmission method, a reception apparatus, reception method, a program, and a broadcasting system that are configured to control, from the transmission side of digital television broadcasting, an access operation of the reception side to a predetermined server.

2. Description of the Related Art

In these days, digital television broadcasting has been promoted in Japan, resulting in the popularization of terrestrial digital broadcasting and BS (Broadcast Satellite) digital broadcasting, for example. With digital television broadcasting, such as terrestrial digital broadcasting, so-called data broadcasting has been realized in addition to program broadcasting. The content carried by this data broadcasting allows the displaying of the information associated with on-air programs as well as the information (announcement of other programs, news, weather forecast, traffic information, and so on) not associated with on-air programs (refer to Japanese Patent Laid-Open No. 2006-50237 below).

It should be noted that, in the data broadcasting in Japan, a band dedicated to data broadcasting was allocated in advance within the broadcasting band for digital television broadcasting at the time television broadcasting was digitalized. The data broadcasting of Japan was realized by broadcasting data broadcast content by use of this dedicated band.

On the other hand, the digital television broadcasting in the USA has no allocation of such a band dedicated to data broadcasting as the Japanese counterpart.

To be more specific, a broadcasting band for the current American digital television broadcasting is occupied by a video band, an audio band, and a control information band, so that no band is allocated to data broadcast content as shown in FIG. 1A. Therefore, the allocation of the band for broadcasting the content for data broadcasting to the limited broadcasting band for digital television broadcasting must narrow the video band and the audio band as shown in FIG. 1B, for example.

SUMMARY OF THE INVENTION

However, the narrowing of the video band and the audio band to allocate a band for broadcasting the content for data broadcasting does not lead to a realistic solution because of the inevitable deterioration in the picture and tone qualities of television programs.

In addition, even if the band for data broadcasting content can be allocated, the data volume that can be transmitted in band thus allocated is necessarily limited. This presents problems that the information volume of data broadcasting content runs low and an attempt to increase the information volume increases the time for the reception side to receive necessary data.

In order to overcome the above-mentioned problem, a method of supplying data broadcasting content to the reception side without using the broadcasting band of digital television broadcasting is considered, in which the reception side is controlled by the broadcasting side to download data broadcasting content from a predetermined server via the Internet.

However, if this method is implemented, the accesses from the reception side to a predetermined server would temporally concentrate to cause an Internet congestion and the increase in server processing load, thereby presenting a problem that data broadcasting content cannot be quickly downloaded, for example. To overcome this problem, some measures must be taken to avoid temporal access concentration from the reception side to a predetermined server. However, such measures have not been established up until the present point of time.

Therefore, the present invention addresses the above-identified and other problems associated with related-art methods and apparatuses and solves the addressed problems by providing a transmission apparatus, a transmission method, a reception apparatus, a reception method, a program, and a broadcasting system that are configured to control the reception side from the broadcasting side such that the accesses from the reception side to a predetermined server are temporally distributed.

In carrying out the invention and according to a first embodiment thereof, there is provided a transmission apparatus for transmitting AV (Audio/Video) content. This transmission apparatus includes: acquisition means for acquiring an estimated number of audience terminals indicative of an estimated number of reception apparatuses receiving the AV content; computation means for, in conjugation with the AV content, computing, on the basis of the estimated number of audience terminals, a validity probability of trigger information associated with control of an application program to be executed in the reception apparatus; generation means for generating the trigger signal including the computed validity probability; and transmission means for transmitting the generated trigger information with the AV content.

In the above-mentioned transmission apparatus, the generation means generates, including the computed validity probability, trigger information for controlling, in the reception apparatus, at least one of processing of acquiring the application program, processing of launching the acquired application program, processing of event firing in the active application program, processing of suspending the active application program, and processing of terminating the active application program.

In the above-mentioned transmission apparatus, the generation means generates, including the computed validity probability, the trigger information for controlling, in the reception apparatus, at least one of processing of acquiring the application program that involves processing of accessing a predetermined server and processing of event firing in the active application program.

In the above-mentioned transmission apparatus, the acquisition means acquires the estimated number of audience terminals on the basis of past viewing statistics.

In the above-mentioned transmission apparatus, the acquisition means acquires the estimated number of audience terminals on the basis of actual measurements of access to the server.

In carrying out the invention and according to the first embodiment thereof, there is provided a transmission method for a transmission apparatus for transmitting AV (Audio/Video) content. This transmission method includes the steps of: acquiring, by the transmission apparatus, an estimated number of audience terminals indicative of an estimated number of reception apparatuses receiving the AV content; computing, by the transmission apparatus, in conjugation with the AV content, on the basis of the estimated number of audience terminals, a validity probability of trigger information associated with control of an application program to be executed in the reception apparatus; generating, by the transmission apparatus, the trigger information including the computed validity probability; and transmitting, by the transmission apparatus, the generated trigger information with the AV content.

In carrying out the invention and according to the first embodiment thereof, there is provided a program for controlling a transmission apparatus for transmitting AV (Audio/Video) content. This program causes a computer of the transmission apparatus to execute processing including the steps of: acquiring an estimated number of audience terminals indicative of an estimated number of reception apparatuses receiving the AV content; computing, in conjugation with the AV content, on the basis of the estimated number of audience terminals, a validity probability of trigger information associated with control of an application program to be executed in the reception apparatus; generating the trigger information including the computed validity probability; and transmitting the generated trigger information with the AV content.

In the first embodiment of the invention, the estimated number of audience terminals indicative of the estimated number of receiving apparatuses receiving AV content is acquired. In conjugation with the received AV content, the validity probability of the trigger information associated with the control of an application program to be executed on the reception apparatus is computed on the basis of the estimated number of audience terminals. Trigger information is generated including the computed validity probability. The generated trigger information is transmitted with AV content.

In carrying out the invention and according to a second embodiment thereof, there is provided a reception apparatus for receiving transmitted AV (Audio/Video) content. This reception apparatus includes: extraction means for extracting trigger information associated with control of an application program, transmitted with the AV content, to be executed in conjugation with the AV content; determination means for determining whether the trigger information is valid on the basis of a validity probability included in the extracted trigger information; and control means for controlling processing associated with the application program in response to a command indicated by the extracted trigger information only when the trigger information is determined to be valid.

In the above-mentioned reception apparatus, the control means controls at least one of processing of acquiring the application program, processing of launching the acquired application program, processing of event firing in the active application program, processing of suspending the active application program, and processing of terminating the active application program in accordance with a command indicated by the extracted trigger information only when the trigger information is determined to be valid.

In the above-mentioned reception apparatus, the control means controls at least one of processing of acquiring the application program that involves processing of accessing a predetermined server and processing of event firing in the active application program in accordance with a command indicated by the extracted trigger information only when the trigger information is determined to be valid.

In carrying out the invention and according to the second embodiment thereof, there is provided a reception method for a reception apparatus for receiving transmitted AV (Audio/Video) content. This reception method includes the steps of: extracting, by the reception apparatus, trigger information associated with control of an application program, transmitted with the AV content, to be executed in conjugation with the AV content; determining, by the reception apparatus, whether the trigger information is valid on the basis of a validity probability included in the extracted trigger information; and controlling, by the reception apparatus, processing associated with the application program in response to a command indicated by the extracted trigger information only when the trigger information is determined to be valid.

In carrying out the invention and according to the second embodiment thereof, there is provided a program for controlling a reception apparatus for receiving transmitted AV (Audio/Video) content. This program causes a computer of the reception apparatus to execute processing including the steps of: extracting trigger information associated with control of an application program, transmitted with the AV content, to be executed in conjugation with the AV content; determining whether the trigger information is valid on the basis of a validity probability included in the extracted trigger information; and controlling processing associated with the application program in response to a command indicated by the extracted trigger information only when the trigger information is determined to be valid.

In the second embodiment of the invention, the trigger information associated with the control of an application program to be executed in conjugation with AV content, this application program being transmitted with the AV content, is extracted. The extracted trigger information is determined whether valid or not on the basis of the validity probability included in this extracted trigger information. Only when the trigger information is determined to be valid, the processing associated with the application program is controlled in accordance with a command indicated by the extracted trigger information.

In carrying out the invention and according to a third embodiment thereof, there is provided a broadcasting system including: a transmission apparatus for transmitting AV (Audio/Video) content; and a reception apparatus for receiving the AV content transmitted from the transmission apparatus. In this broadcasting system, the transmission apparatus has acquisition means for acquiring an estimated number of audience terminals indicative of an estimated number of reception apparatuses receiving the AV content, computation means for, in conjugation with the AV content, computing, on the basis of the estimated number of audience terminals, a validity probability of trigger information associated with control of an application program to be executed in the reception apparatus, generation means for generating the trigger information including the computed validity probability, and transmission means for transmitting the generated trigger information with the AV content. In this broadcasting system, the reception apparatus has extraction means for extracting trigger information transmitted with the AV content, to be executed in conjugation with the AV content, determination means for determining whether the trigger information is valid on the basis of a validity probability included in the extracted trigger information, and control means for controlling processing associated with the application program in response to a command indicated by the extracted trigger information only when the trigger information is determined to be valid.

In the third embodiment of the invention, the following processing is executed by the transmission apparatus. The estimated number of audience terminals indicative of the estimated number of reception apparatuses receiving AV content is acquired. In conjugation with AV content, a validity probability of the trigger information associated with the control of an application program to be executed on the reception apparatus is computed on the basis of the estimated number of audience terminals. The trigger information is generated by including the computed validity probability. The generated trigger information is transmitted with AV content. The following processing is executed by the reception apparatus. The trigger information associated with the control of an application program to be executed in conjugation with AV content is extracted, this application being transmitted with the AV content. The trigger information is determined whether valid or not on the basis of the validity probability included in the extracted trigger information. Only when the trigger information is determined to be valid, the processing associated with the application program is controlled in accordance with a command indicated by the extracted trigger information.

According to the first embodiment of the invention, control is provided such that many reception apparatuses access a predetermined server in a temporally distributed manner.

According to the second embodiment of the invention, the processing of accessing a predetermined server is executed under the control of a transmission apparatus.

According to the third embodiment of the invention, the accesses to a predetermined server from reception apparatuses are temporally distributed.

BRIEF DESCRIPTION OF THE DRAWINGS

Other features of the invention will become apparent from the following description of embodiments with reference to the accompanying drawings in which:

FIG. 7 is a diagram illustrating items in the trigger information of a precache command;

FIG. 8 is a diagram illustrating items in the trigger information of an execute command;

FIG. 9 is a diagram illustrating items in the trigger information of an inject event command;

FIG. 10 is a diagram illustrating items included in the trigger information of a suspend command;

FIG. 11 is a diagram illustrating items included in the trigger information of a terminate command;

FIG. 12 is a diagram illustrating one example of a syntax of trigger information;

FIGS. 13A, 13B, 13C, 13D, 13E, 13F, and 13G are diagrams illustrating display examples to be obtained when a data broadcasting application program is executed in conjugation with the progress of programs and CMs;

FIGS. 16A and 16B are diagrams illustrating the effects of Trigger_validity;

FIG. 24 is a block diagram illustrating an exemplary configuration of a computer.

DETAILED DESCRIPTION OF THE PREFERRED EMBODIMENTS

This invention will be described in further detail by way of embodiments thereof with reference to the accompanying drawings.

[Exemplary Configuration of a Broadcasting System]

Figure 1:
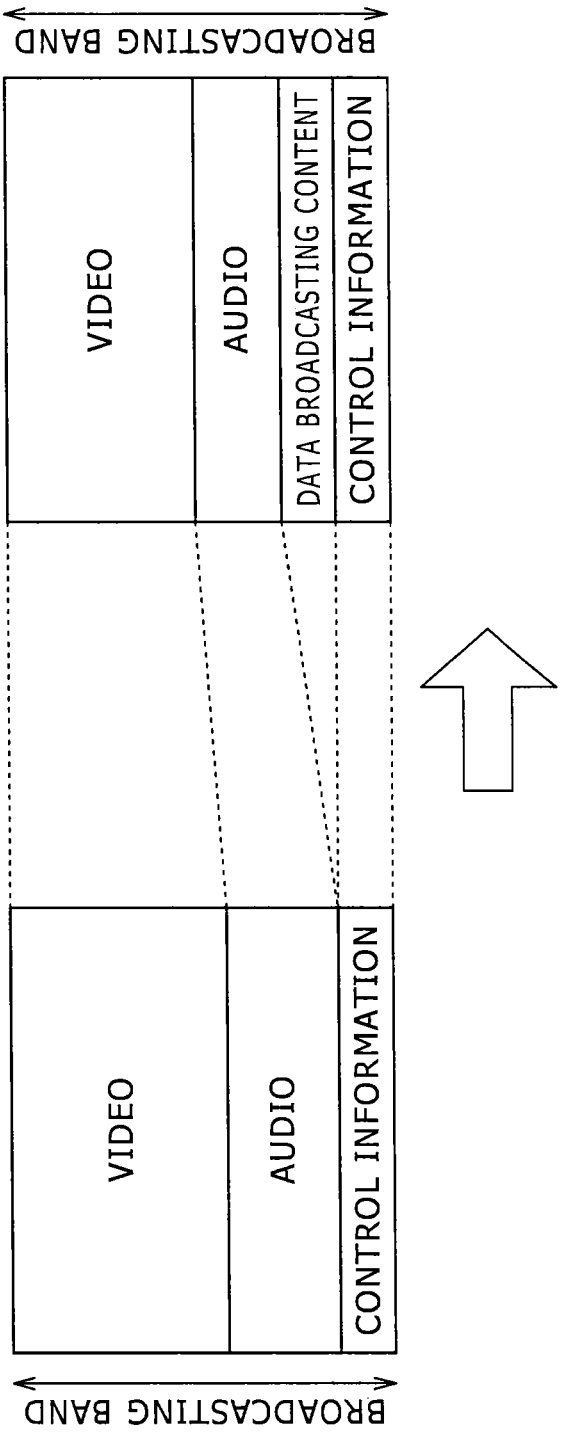
FIGS. 1A and 1B are diagrams illustrating a broadcasting band for digital television broadcasting.
Figure 2:
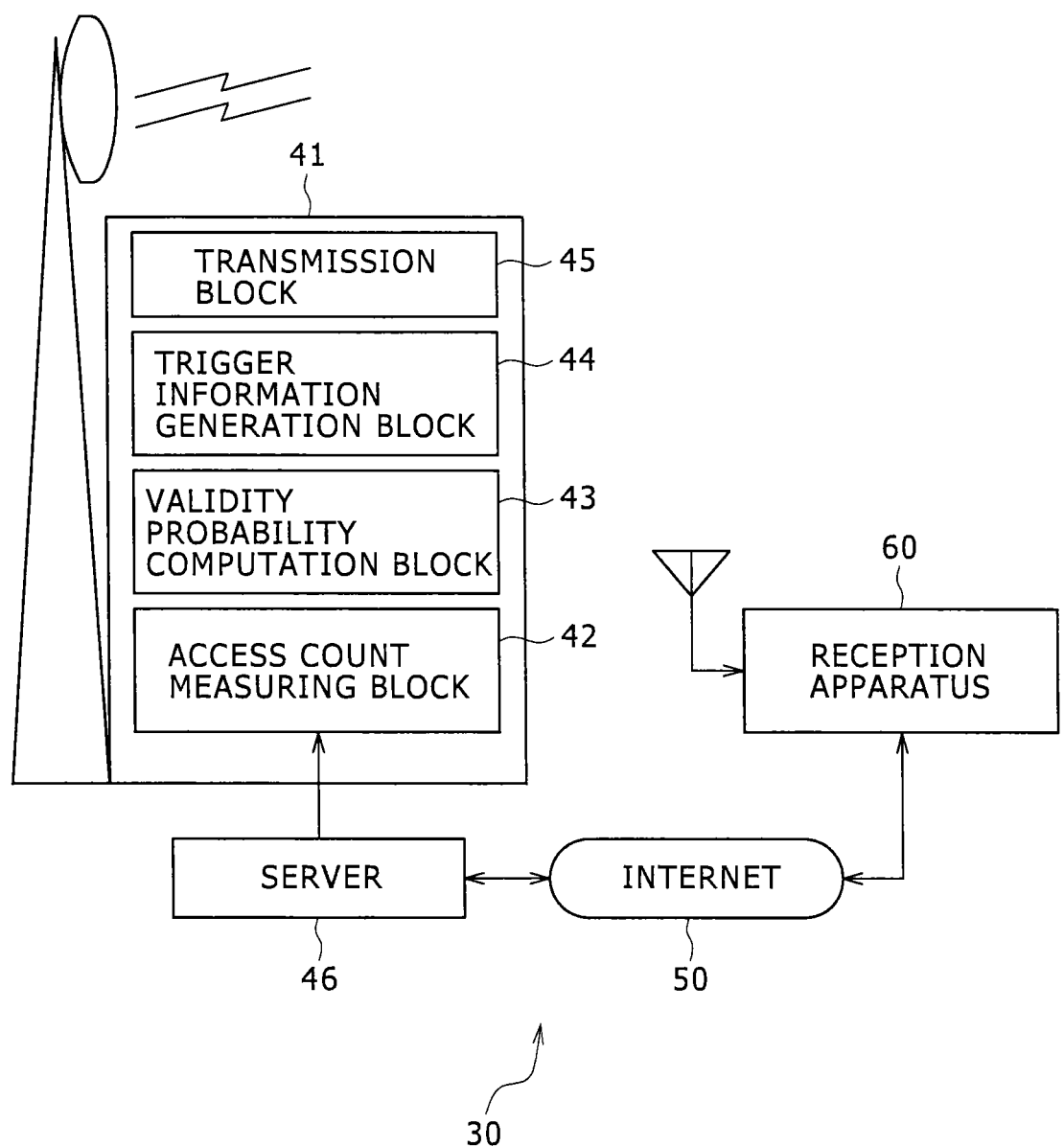
FIG. 2 is a schematic block diagram illustrating an exemplary configuration of a broadcasting system practiced as one embodiment of the present invention.

Now, referring to FIG. 2, there is shown a schematic block diagram illustrating a broadcasting system practiced as one embodiment of the invention. This broadcasting system 30 is made up of a broadcasting apparatus 41 and a server 46 that are arranged at the broadcasting station side and a reception apparatus 60 that is arranged at each reception side.

With the broadcasting system 30, each reception apparatus 60 accesses the server 46 in accordance with trigger information that is transmitted as included in a digital television broadcast signal. To be more specific, whether or not each reception apparatus 60 executes access on the basis of validity probability parameter N written to item Trigger_validity of trigger information is determined, thereby distributing the access from each reception apparatus 60 during a period in which the trigger information is transmitted two or more times.

It should be noted that the reception apparatus 60 accesses the server 46 to download therefrom data broadcasting content to be executed in conjugation with the AV content of a program and a CM and upload predetermined information to the server 46 by being fired as an event of the active data broadcasting content, for example.

Data broadcasting content is realized when an application program supplied to a reception apparatus is executed by the computer of the reception apparatus, so that the data broadcasting content is hereafter referred to also as a data broadcasting application program or a data broadcasting application.

The broadcasting apparatus 41 transmits digital television broadcast signals. At the same time, the broadcasting apparatus 41 transmits, as included in a digital television broadcast signal, trigger information that is a command for controlling the execution of data broadcasting content to be executed in conjugation with the progress of a program or a CM.

The broadcasting apparatus 41 has an access count measuring block 42, a validity probability computation block 43, a trigger information generation block 44, and a transmission block 45.

The access count measuring block 42 measures the number of accesses made from the reception apparatus 60 to the server 46. The validity probability computation block 43 computes validity probability parameter N that is one of the items of trigger information. The computation of validity probability parameter N is made on the basis of the number of measured accesses made to the server 46, an obtained estimated total number of reception apparatuses 60, an estimated audience ratio of a broadcast program, an estimated number of running reception apparatuses 60, and a period in which the same trigger information is repeatedly transmitted.

The trigger information generation block 44 generates trigger information for controlling the execution of a data broadcasting application in the reception apparatus 60. With the generated trigger information, validity probability parameter N computed by the validity probability computation block 43 is written to item Trigger_validity. It should be noted that there may be trigger information that has no item Trigger_validity.

Trigger information includes the information indicative of command type and the information for identifying corresponding data broadcasting content, in addition to validity probability parameter N described above. Details of the trigger information will be described later.

The transmission block 45 transmits the generated trigger information as multiplexed with a transport stream (TS) of digital television broadcast signals or embedded in a video signal.

In response to a request from the reception apparatus 60 that has accessed the server 46 via the Internet 50, the server 46 supplies a data broadcasting application to the reception apparatus 60 (namely, makes the reception apparatus 60 download the data broadcasting application). In addition, the server 46 receives an access (questionnaire replies for example) from the reception apparatus 60 by an event (a questionnaire during a program for example) fired in the active data broadcasting application.

The reception apparatus 60 receives a digital broadcasting signal broadcast from the broadcasting apparatus 41 and outputs the video and audio of AV content (a television program, a CM, and so on) to a display monitor at subsequent stage, not shown. In addition, the reception apparatus 60 accesses the server 46 via the Internet 50 to obtain a data broadcasting content. In addition, by executing the data broadcasting content in accordance with the received trigger information, the reception apparatus 60 presents various kinds of information to the user in conjugation with the progress of a program and accesses the server 46.

It should be noted that this reception apparatus 60 may be arranged as a standalone unit or as incorporated in a television receiver or a video recorder, for example.

[Exemplary Configuration of the Reception Apparatus]

Figure 3:
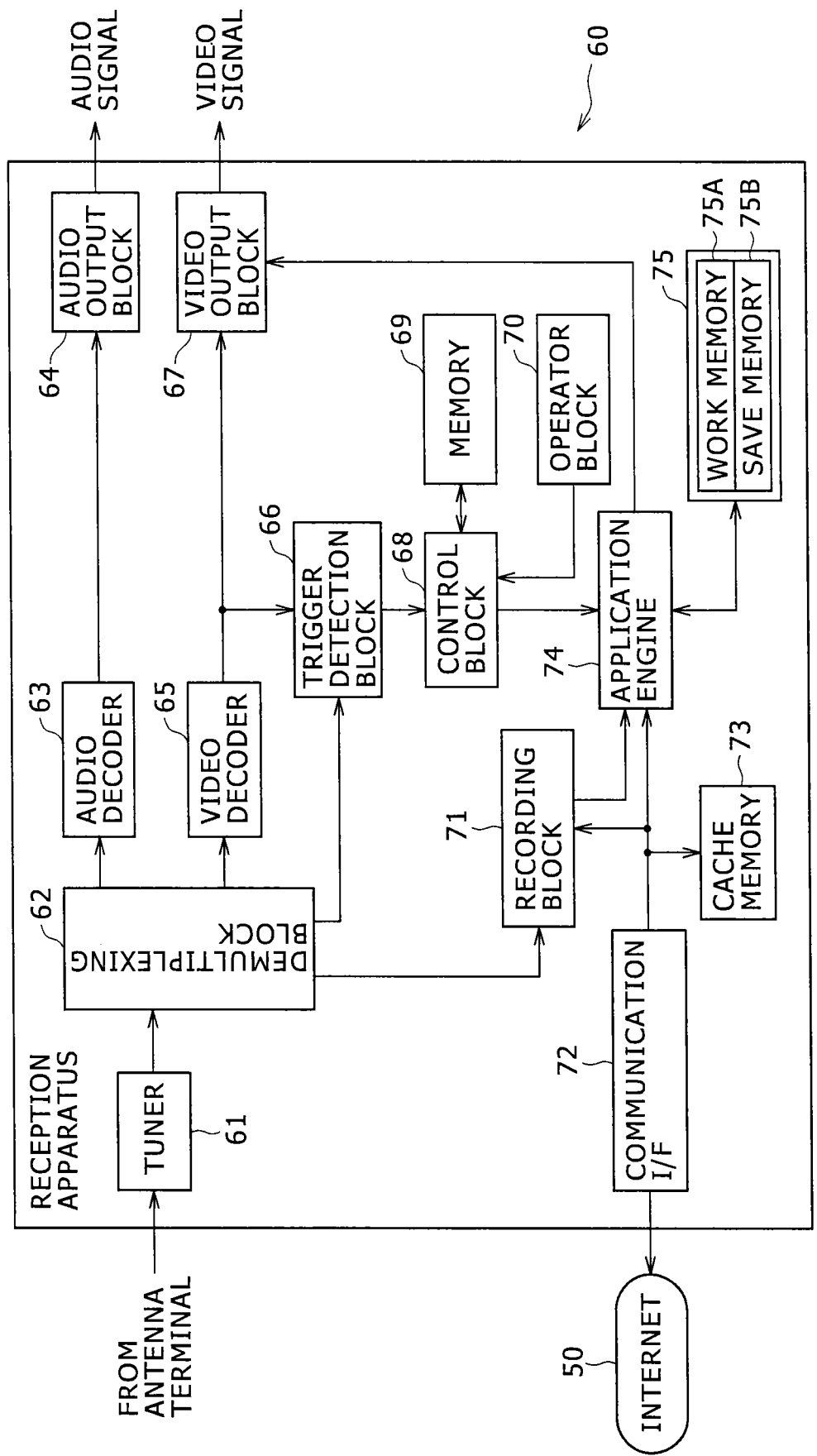
FIG. 3 is a block diagram illustrating an exemplary configuration of a reception apparatus practiced as another embodiment of the present invention.

Referring to FIG. 3, there is shown an exemplary configuration of the reception apparatus 60. The reception apparatus 60 is made up of a tuner 61, a demultiplexer 62, an audio decoder 63, an audio output block 64, a video decoder 65, a trigger detection block 66, a video output block 67, a control block 68, a memory 69, an operator block 70, a recording block 71, a communication I/F 72, a cache memory 73, an application engine 74, and an application memory 75.

The tuner 61 receives a digital television broadcasting signal corresponding to a channel selected by a user, demodulates the received signal, and outputs a resultant TS to the demultiplexer 62. The demultiplexer 62 separates the TS supplied from the tuner 61 into an audio encoded signal, a video encoded signal, and a control signal and supplies these signals to the audio decoder 63, the video decoder 65, and the control block 68, respectively.

Further, the demultiplexer 62 extracts a PCR (Program Clock Reference) packet stored in the trigger information from the TS and outputs the extracted PCR packet to the trigger detection block 66.

The audio decoder 63 decodes the entered audio encoded signal and outputs a resultant audio signal to the audio output block 64. The audio output block 64 outputs the entered audio signal to a subsequent stage (a loudspeaker for example).

The video decoder 65 decodes the entered video encoded signal and outputs a resultant video signal to the trigger detection block 66 and the video output block 67.

The trigger detection block 66 always monitors the entered video signal to detect trigger information embedded in the video signal and outputs the detected trigger information to the control block 68 (if the trigger information is arranged only in a PCR packet of a TS, the operation of this trigger detection block 66 is not required). In addition, the trigger detection block 66 extracts trigger information from a PCR packet entered from the demultiplexer 62 and outputs the extracted trigger information to the control block 68.

The video output block 67 outputs the video signal entered from the video decoder 65 to a subsequent stage. In addition, the video output block 67 combines the video signal of the data broadcasting content entered from the application engine 74 and the video signal entered from the video decoder 65 and outputs a resultant signal to a subsequent stage.

The control block 68 controls the entire reception apparatus 60 by executing a control program stored in the memory 69. Also, on the basis of the trigger information entered from the trigger detection block 66, the control block 68 controls the acquisition, launching, event-firing, pausing, and terminating of the data broadcasting application.

The memory 69 stores the control program that is executed by the control block 68. This control program can be updated on the basis of the update data that is obtained from a digital television broadcasting signal or via the Internet 50. The operator block 70 receives operations done by the user and supplies the operation signals corresponding to the operations to the control block 68.

The memory 69 also stores such user profile information entered by the user in advance as user's age, gender, address, and so on.

This profile information is referenced by the active data broadcasting application for example and, only if the user profile information satisfies a predetermined condition, can be used for event firing for example. Also, this profile information may be uploaded to the server 46.

If a data broadcasting application is distributed by use of a digital television broadcast signal, the recording block 71 stores a downloaded data broadcasting application in the recording media incorporated in the recording block 71.

The communication I/F 72 connects the reception apparatus 60 to the server 46 via the Internet 50 under the control of the application engine 74. Under the control of the control block 68, the application engine 74 obtains a data broadcasting application from the server 46 via the communication I/F 72 and the Internet 50 and stores the data broadcasting application in the cache memory 73.

Under the control of the control block 68, the application engine 74 reads the data broadcasting application from the recording block 71 or the cache memory 73 to execute the data broadcasting application.

The application memory 75 is composed of a work memory 75A and a save memory 75B. The application engine 74 stores data (to be more specific, the data including the layer of displayed information) associated with the active data broadcasting application into the work memory 75A. If the application engine 74 suspends the active data broadcasting application, the application engine 74 moves the data in the work memory 75A of the application memory 75 to the save memory 75B. To restart the suspended data broadcasting application, the application engine 74 moves the data from the save memory 75B to the work memory 75A to resume the state as it was before the pausing.

It should be noted that the two areas of the same size in the application memory 75 may be alternately specified as the work memory 75A and the save memory 75B. This memory switching arrangement eliminates the necessity of moving data between the work memory 75A and the save memory 75B.

[Trigger Information Transmission Method]

The following describes a method of transmitting trigger information.

As described above, trigger information can be arranged in a PCR packet of a TS of a digital television broadcast signal, embedded in a video signal, or arranged in the user data area of an MPEG2 (Moving Picture Experts Group phase 2) video stream multiplexed with the TS.

Figure 4:
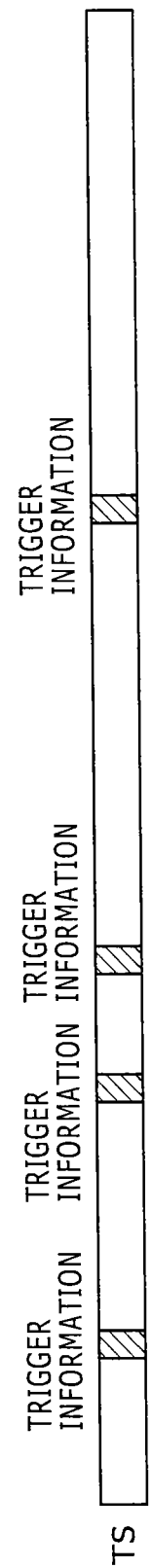
FIG. 4 is a diagram illustrating a concept of transmitting trigger information as stored in a PCR packet of a TS.

Referring to FIG. 4, there is shown a concept in which trigger information is arranged in a PCR packet of the TS of a digital television broadcast signal.

As shown in the figure, trigger information is not stored in all PCR packets, but stored in a PCR packet only with a timing proper for linking to a program or a CM.

It should be noted that trigger information is transmitted two or more times consecutively in the same contents (namely, the same command for the same data broadcasting application, for example) in consideration of an electromagnetic interference or a failure (or a reception failure) of the reception apparatus 60. However, the trigger information having the same contents to be transmitted two or more times does not have the same validity probability parameter N written to item Trigger_validity.

Figure 5:
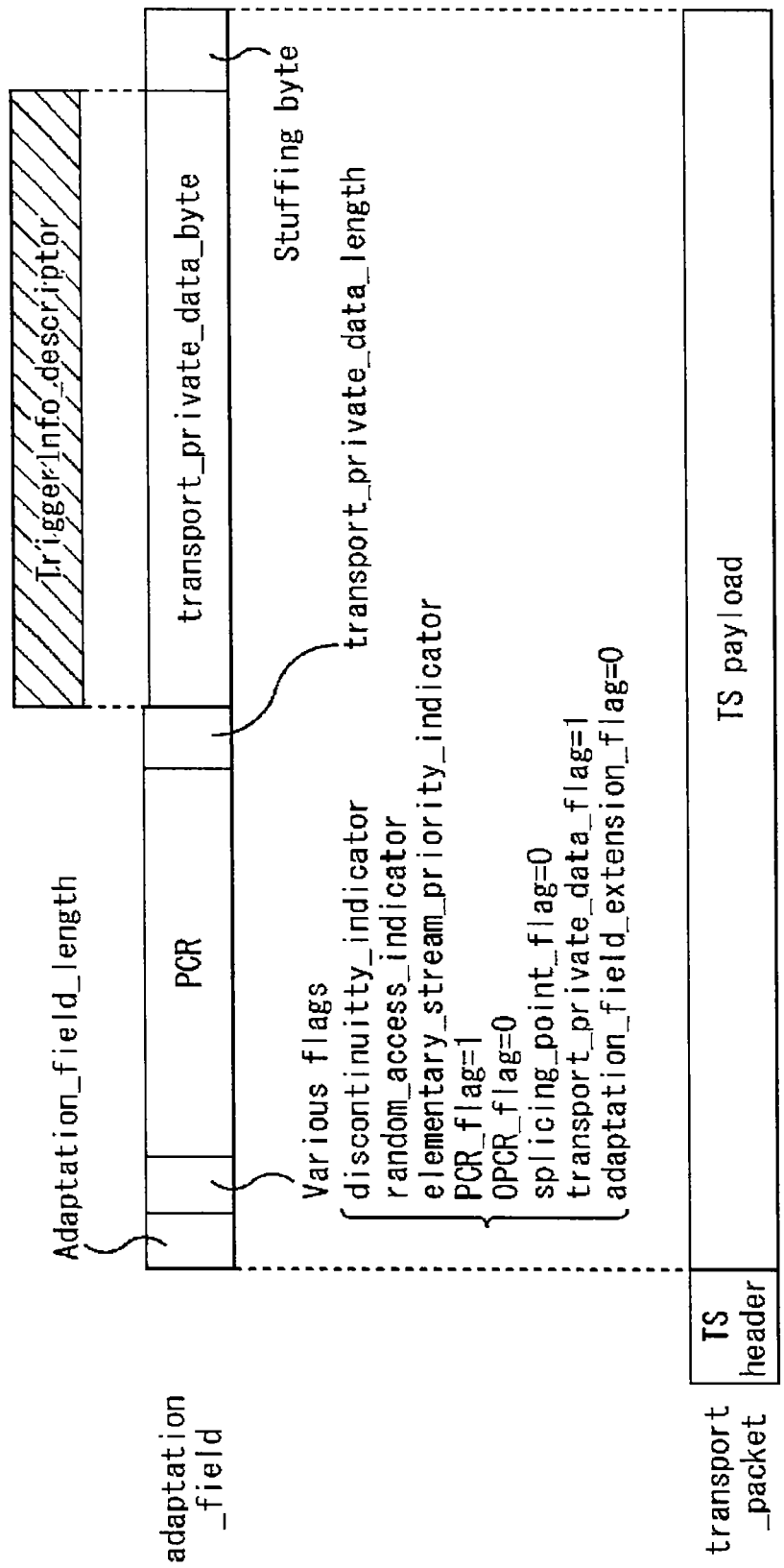
FIG. 5 is a diagram illustrating a specific arrangement of a trigger information in the PCR packet.

Referring to FIG. 5, there is shown a location at which trigger information is stored in a PCR packet. With a PCR packet, PCR is stored in adaptation_field of a TS packet, in which trigger information (Trigger_Info_descriptor) is stored in transport_private_data_byte subsequent to PCR. It should be noted that, if trigger information is stored, transport_private_data_flag of Various_flags arranged in front of PCR is set to "1."

Figure 6A:
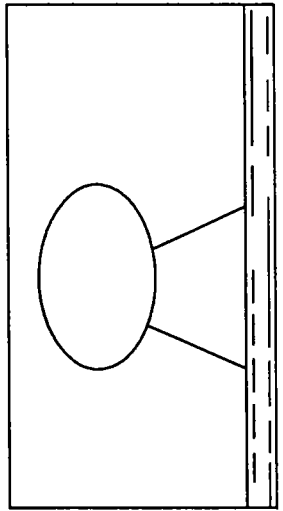
FIGS. 6A and 6B are diagrams illustrating examples of embedding a trigger information in a video signal.
Figure 6B:
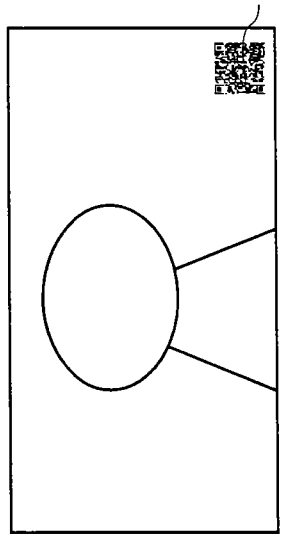

Referring to FIGS. 6A and 6B, there are shown two types of examples of embedding trigger information in a video signal.

FIG. 6A shows an example in which trigger information is two-dimensionally barcoded to be superimposed on a predetermined location (the lower right corner in this case) of the image of a video signal. FIG. 6B shows an example in which trigger information is video-coded to be superimposed on the lower several lines of the image of a video signal. The trigger information shown in FIG. 6A and FIG. 6B is detected by the trigger detection block 66 of the reception apparatus 60.

In each of FIG. 6A and FIG. 6B, trigger information is arranged on the screen of a television program, so that, in the case where a television program is redistributed by use of a CATV network for example, the television program can also be transmitted to the reception apparatus 60 with the trigger information undeleted.

In each of the examples shown in FIG. 6A and FIG. 6B, the trigger information (a two-dimensional barcode or a video code) on the screen is visually recognizable by the user of the reception apparatus 60; however, if this is not desired, the two-dimensional barcode or the video code may be masked by the pixels therearound before being displayed.

In the example described above, trigger information is transmitted as stored in a PCR. However, the storage location and the transmission method of trigger information are not restricted to those of this example.

[Detail of Trigger Information]

The following describes details of trigger information. Trigger information is classified into five types according to commands indicated by the trigger information. There are five types of commands; pre-cache command, execute command, inject event command, suspend command, and terminate command. It is also practicable to add other commands to the above-mentioned commands.

Referring to FIG. 7, there are shown items included in trigger information that is a pre-cache command. A pre-cache command specifies the reception apparatus 60 to acquire a data broadcasting application.

In the pre-cache command, Trigger_id is information for identifying this trigger information. If pieces of trigger information having the same contents are transmitted two or more times, each piece of trigger information has the same Trigger_id. Protocol_version is indicative of the version of a protocol of this trigger information. Command_code is indicative of the type of the command of this trigger information. In the example shown in FIG. 7, Command_code has information indicative of a pre-cache command.

Trigger_validity is written with validity probability parameter N indicative of a value for specifying a probability when each reception apparatus 60 that has received this trigger information is determined to execute processing in accordance with this trigger information in order to distribute the accesses to the server 46 from the reception apparatuses 60.

For example, in order to distribute the access to the server 46 by many reception apparatuses 60 into four groups, the same trigger information may be transmitted four times: namely, in the first trigger information, validity probability parameter N=4; in the second trigger information, validity probability parameter N=3; in the third trigger information, validity probability parameter N=2; and in the fourth trigger information, validity probability parameter N=1.

Notifying the reception apparatuses 60 of the validity probability can prevent the temporary concentration of the processing for a data broadcasting application by the accesses from two or more reception apparatuses 60 to the server 46.

It should be noted that, in the trigger information (for example, the trigger information of a suspend command or a terminate command to be described later) for controlling the processing of not accessing the server 46 for example, the validity probability may always be set to 1.

The access distribution by use of Trigger_validity will be described later with reference to FIGS. 15A and 15B, FIGS. 16A and 16B, FIG. 19 and subsequent figures.

App_id is information for identifying a data broadcasting application to be obtained in correspondence with this trigger information. App_type is information indicative of the type (HTML5, BML, Java or the like for example) of the data broadcasting application corresponding to this trigger information. App_url is the URL of the acquisition source (the server 46 in this case) of the data broadcasting application.

Broadcast_App_flag, Downloaded_App_flag, and Internet_App_flag are indicative of locations of the program data of the data broadcasting applications corresponding to this trigger information. Broadcast_App_flag is set to "1" if the data broadcasting application corresponding to this trigger information is obtainable from a digital television broadcast signal. Downloaded_App_flag is set to "1" if the data broadcasting application corresponding to this trigger information has already been broadcast by a downloaded broadcast service and therefore is obtainable from a local storage (the recording block 71 for example) if the data broadcasting application has been received by the reception apparatus 60. Internet_App_flag is set to "1" if the data broadcasting application corresponding to this trigger information is obtainable from the application server 46 via the Internet 50.

Referring to FIG. 8, there are shown items included in trigger information that is an execute command. An execute command specifies the reception apparatus 60 to launch a data broadcasting application.

Trigger_id, Protocol_version, Command_code, Trigger_validity, App_id, App_type, App_url, Broadcast_App_flag, Downloaded_App_flag, and Internet_App_flag are substantially the same as those of the trigger information that is a pre-cache command shown in FIG. 7. A difference, however, lies in that Command_code has information indicative of an execute command.

App_life_scope is indicative whether or not to terminate the active data broadcasting application in response to the switching of video. App_expire_date is indicative of a date on which to terminate the active data broadcasting application without receiving a terminate command.

Referring to FIG. 9, there are shown items included in trigger information that is an inject event command. An inject event command causes the reception apparatus 60 to fire an event in the active data broadcasting application.

An event herein denotes a timing with which to start the processing of switching the information displayed by a data broadcasting application, the processing of uploading (or notifying) audience questionnaire results executed in a program to the server 46, and so on, for example.

Trigger_id, Protocol_version, Command_code, Trigger_validity, App_id, and App_type are substantially the same those of the trigger information that is a pre-cache command shown in FIG. 7. A difference, however, lies in that Command_code has information indicative of an inject event command.

Writing proper validity probability parameter N to Trigger_validity that is the trigger information as an inject event command can distribute the event occurrence timings in the two or more reception apparatuses 60 that are receiving a program. This prevents the temporary concentration of the accesses from two or more reception apparatuses 60 to the server 46, thereby dispersing the accesses.

Event_id is identification information about an even to be fired in the data broadcasting application specified by App_id. Event embedded data has data that is referenced when firing the event.

Referring to FIG. 10, there are shown items included in trigger information that is a suspend command. A suspend command causes the reception apparatus 60 to suspend the active data broadcasting application.

Trigger_id, Protocol_version, Command_code, Trigger_validity, App_id, and App_type are substantially the same as those of the trigger information that is a pre-cache command shown in FIG. 7. A difference, however, lies in that Command_code has information indicative of a suspend command.

Referring to FIG. 11, there are shown items included in trigger information that is a terminate command. A terminate command causes the reception apparatus 60 to terminate the active data broadcasting application.

Trigger_id, Protocol_version, Command_code, Trigger_validity, App_id, and App_type are substantially the same as those of the trigger information that is a pre-cache command shown in FIG. 7. A difference, however, lies in that Command_code has information indicative of a terminate command.

[Syntax of Trigger Information]

Referring to FIG. 12, there is shown an example of a syntax of trigger information compliant with the trigger information that is each of the commands described above. It should be noted that the syntax of trigger information is not restricted to that shown in FIG. 12. Any other syntaxes are available.

[Explanation of Operations]

The following describes an overview of operations to be executed by the reception apparatus 60 in response to received trigger information, especially the transitions of the screen display.

Referring to FIGS. 13A to 13G, there are shown transitions between the display screens of the reception apparatus 60 when the data broadcasting application corresponding to a television program or a CM is executed by the reception apparatus 60.

For example, as shown in FIG. 13A, when a television program (in this example, "News of 7:00") is being broadcast and the contents of the program transition to economic information, the trigger information of an execute command for launching the data broadcasting application corresponding to the program is transmitted. When this trigger information is received, the data broadcasting application is launched and, on the screen on which the program is displayed, an icon (in this example, "Stock") for prompting the user to display the data broadcasting application is displayed as shown in FIG. 13B.

When the user clicks this icon, the display (in this example, stock price information display) by the data broadcasting application is executed as shown in FIG. 13C. Thus, only when the icon for prompting the user to display the data broadcasting application is displayed, the display by the data broadcasting application is executed, thereby preventing the trouble for the user who does not require the display by the data broadcasting application. It should be noted however that the above-mentioned icon display is also the first display of the data broadcasting application.

When the contents of the program further transition (to the sport information in this example), the trigger information of an inject event command for firing the event is transmitted in response. When the inject event command is received, an event is fired, thereby changing the display by the data broadcasting application on the screen as shown in FIG. 13D (in this example, to game results information display).

Next, a suspend command for suspending the active data broadcasting application corresponding to the program is transmitted. When this suspend command is received, the active data broadcasting application is suspended. Then, the trigger information of an execute command for launching the data broadcasting application corresponding to the CM is transmitted. When this execute command is received, the data broadcasting application for the CM program is launched. Consequently, on the screen on which the CM is displayed, an icon ("Prize Application" in this example) for prompting the user to display the data broadcasting application corresponding to the CM is displayed as shown in FIG. 13E.

When the user clicks this icon, the display (in this example, the display for prize application) is executed on the screen by the data broadcasting application corresponding to the CM.

When the display of the CM has been completed, in conjunction with resuming of the program, the trigger information of an execute command for resuming the data broadcasting application corresponding to the program is transmitted. When this execute command is received, the data broadcasting application for the CM is terminated and the display of this data broadcasting application is deleted, upon which the data broadcasting application of the program is resumed from the suspended state as shown in FIG. 13F.

Then, when the program ends, the trigger information of a terminate command for terminating the data broadcasting application corresponding to the program is transmitted. When this trigger information is received, the display of the data broadcasting application is deleted from the screen as shown in FIG. 13G and only the video of the program is displayed.

It should be noted that a data broadcasting application can be displayed not only by a method in which the display area of a program is shrunk to provide the area for displaying the data broadcasting application as shown in FIGS. 13A to 13G, but also by another method in which the display of a data broadcasting application is superimposed on the display of a program, for example.

The following describes an operation (hereafter referred to trigger information handling processing) to be executed upon reception of trigger information by the reception apparatus 60.

Figure 14:
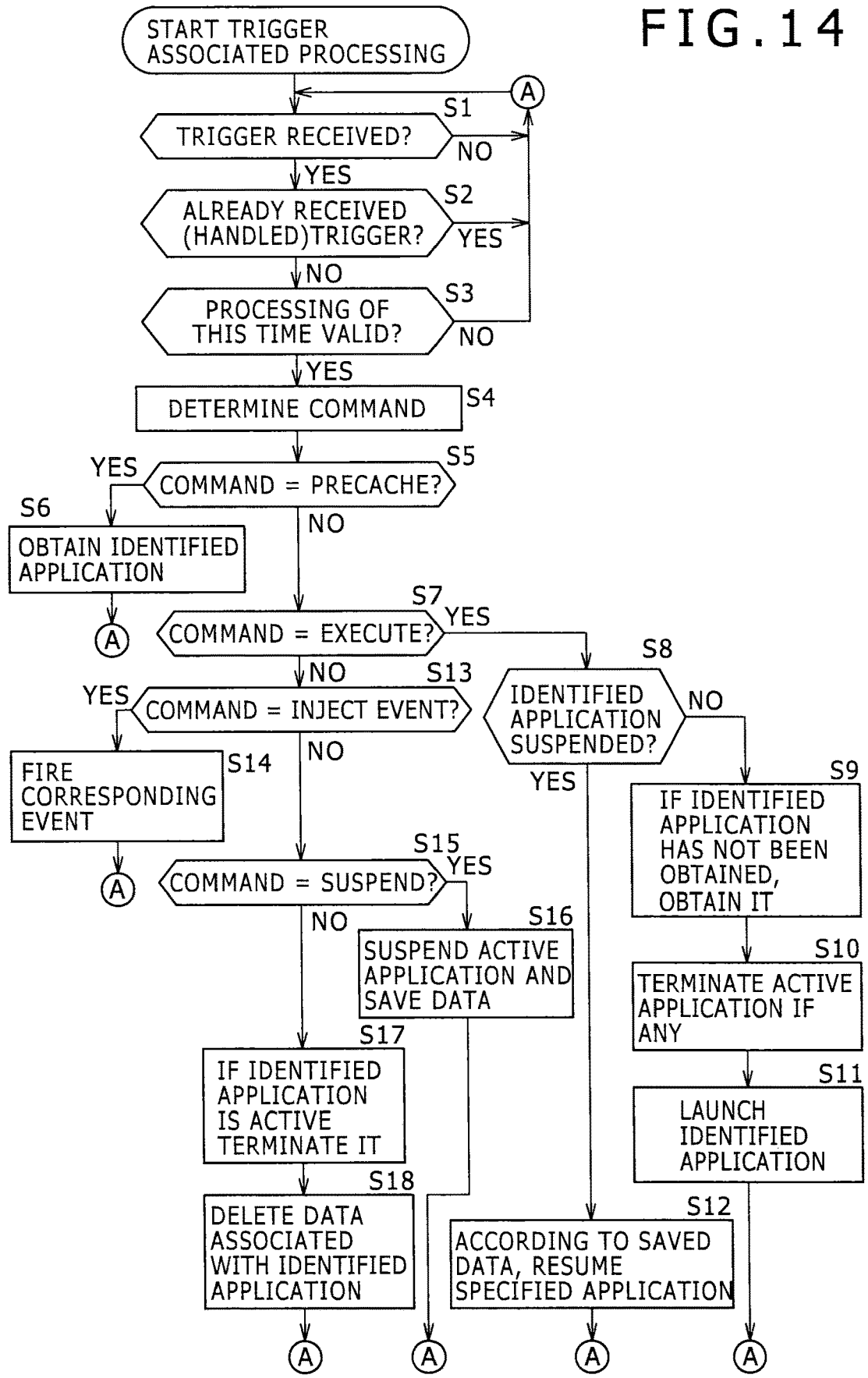
FIG. 14 is a flowchart indicative of trigger information responding processing.

Referring to FIG. 14, there is shown a flowchart indicative of the trigger information handling processing. This trigger information handling processing is repeatedly executed while the user is viewing a television program, namely, while the reception apparatus 60 is receiving digital television broadcast signals.

In step S1, the trigger detection block 66 waits until a PCR packet including trigger information is entered from the demultiplexer 62 or trigger information is detected from a video signal outputted from the video decoder 65. When a PCR packet including trigger information is entered or trigger information is detected from a video signal, the procedure goes to step S2.

In step S2, the trigger detection block 66 outputs trigger information to the control block 68. The control block 68 reads Trigger_id of the received trigger information to determine whether the processing of step S4 and subsequent steps has already been executed on this trigger information. If the processing of step S4 and subsequent steps is found executed on this trigger information, then the procedure is returned to step S1 to repeat the above-mentioned processing therefrom. By contrast, if the processing of step S4 and subsequent steps is found not executed on this trigger information, then the procedure goes to step S3.

In step S3, the control block 68 determines on the basis of validity probability parameter N written to Trigger_validity in the trigger information whether the processing of this time is valid or not (whether to advance the procedure to step S4 and later or to return to step S1). It should be noted that, if Trigger_validity is not arranged in the trigger information (or if validity probability parameter N=1), the procedure goes to step S4.

The following describes the decision of whether the processing of this time is valid or not.

Figure 15A:
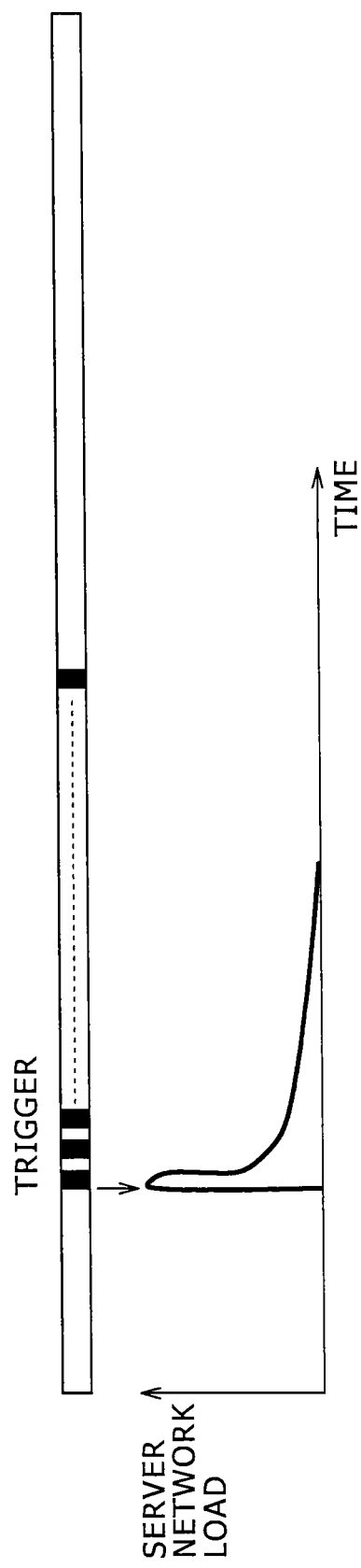
FIGS. 15A and 15B are diagrams illustrating the effects of Trigger_validity.
Figure 15B:
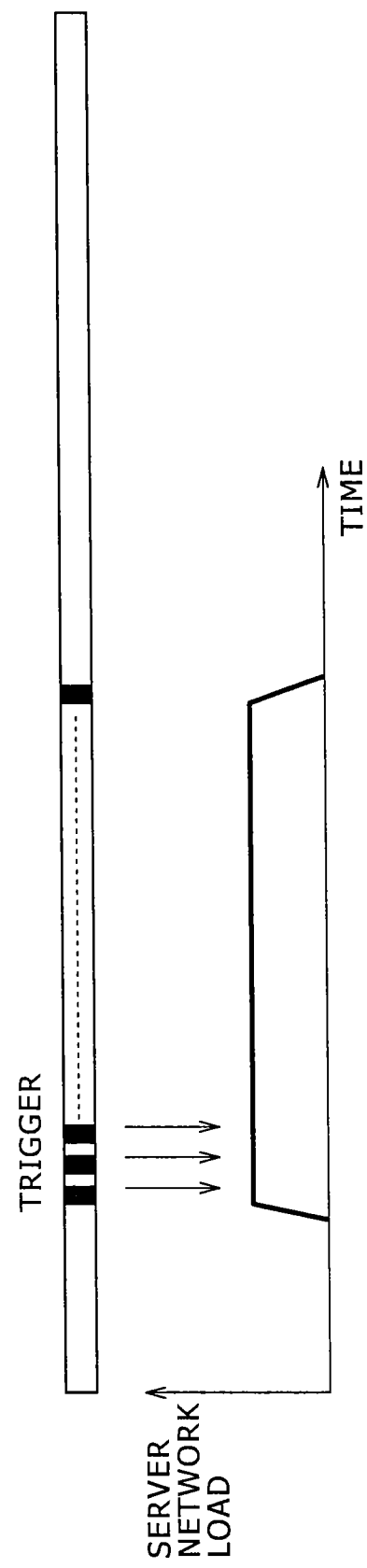

Referring to FIGS. 15A and 15B, there are shown a comparison in the case where Trigger_validity is not arranged (or validity probability parameter=1) and a comparison in the case where Trigger_validity is arranged. If Trigger_validity is not arranged, although the same trigger information is transmitted two or more times, most reception apparatuses 60 respond to the first trigger information, resulting in the concentration of accesses to the server 46 and so on as shown in FIG. 15A.

By contrast, if Trigger_validity is arranged and the validity probability is set to a proper value, the active reception apparatuses 60 can be allocated to the same trigger information in a distributed manner that is transmitted two or more times, thereby preventing the concentration of accesses to the server 46 and so on as shown in FIG. 15B.

For example, as shown in FIG. 16B, if the broadcasting station intends to distribute the accesses from any active reception apparatuses 60 to the server 46 and so on into four times, the broadcasting apparatus 41 transmits the same trigger information four times, in which validity probability parameter N=4 for the Trigger_validity in the first trigger information, validity probability parameter N=3 in the second trigger information, validity probability parameter N=2 in the third trigger information, and validity probability parameter N=1 in the fourth trigger information.

In response, the control block 68 of the reception apparatus 60 determines validity or invalidity in accordance with random numbers under the condition of validity probability.

Consequently, if it is supposed that 100000 units, for example, of reception apparatuses 60 be executing, at the same time, the processing for trigger information, then validity is determined on about 25000 units (=100000/4) of the reception apparatuses 60 by the first trigger information (validity probability 1/N=1/4), validity is determined on about another 25000 units (=75000/3) of the reception apparatuses 60 by the second trigger information (validity probability=1/3), validity is determined on about still another 25000 units (=50000/2) of the reception apparatuses 60 by the third trigger information (validity probability=1/2), and validity is determined on all remaining units (=25000/1) of the reception apparatuses 60 by the fourth trigger information (validity probability=1/1).

Referring to FIG. 14 again, the control block 68 reads Command_code of trigger information in step S4 to determine whether the command indicated by this trigger information is a pre-cache command, an execute command, an inject event command, a suspend command, or a terminate command.

In step S5, the control block 68 determines whether the decision result in step S4 is a pre-cache command. If the decision result is found to be a pre-cache command, then the procedure goes to step S6.

In step S6, the program data of the data broadcasting application identified by App_id of this trigger information is obtained.

To be more specific, if Broadcast_App_flag of this trigger information is "1," then the program data of the data broadcasting identified by App_id is obtained from the television broadcasting signal to be recorded to the recording block 71. If Downloaded_App_flag of this trigger information is "1," then the program data of the data broadcasting application identified by App_id is obtained from the recording block 71 that is a local storage. If Internet_App_flag of this trigger information is "1," then the program data of the data broadcasting application identified by App_id is obtained from the server 46 via the Internet 50 to be recorded to the cache memory 73.

It should be noted that if two or more of Broadcast_App_flag, Downloaded_App_flag, and Internet_App_flag are "1," then, in accordance with the condition of the reception apparatus 60, the program data of the data broadcasting application identified by App_id of this trigger information can be obtained. Subsequently, the procedure is returned to step S1 to repeat the above-mentioned processing therefrom.

In step S5, if the decision result in step S4 is found not to be a pre-cache command, then the procedure goes to step S7. In step S7, the control block 68 determines whether the decision result in step S4 is an execute command. If the decision result is found to be an execute command, then the procedure goes to step S8.

In step S8, under the control of the control block 68, the application engine 74 determines whether the data broadcasting application identified by App_id of this trigger is suspended. To be more specific, the application engine 74 determines that the data broadcasting application is suspended if the data indicative of suspension of the data broadcasting application identified by App_id is saved to the save memory 75B.

In step S8, if the data broadcasting application identified by App_id is found not suspended, then the procedure goes to step S9. In step S9, under the control of the control block 68, the application engine 74 obtains the program data of the data broadcasting application identified by App_id if this program data has not been obtained (that is, this program data is not found in the recording block 71 or the cache memory 73).

In step S10, under the control of the control block 68, the application engine 74 terminates the active data broadcasting application if any.

In step S11, under the control of the control block 68, the application engine 74 launches the data broadcasting application identified by App_id. Then, the procedure is returned to step S1 to repeat the above-mentioned processing therefrom.

It should be noted that, if the data broadcasting application identified by App_id is found suspended in step S8, then the procedure goes to step S12. In step S12, under the control of the control block 68, the application engine 74 moves the data from the save memory 75B to the work memory 75A and launches the data broadcasting application identified by App_id. Consequently, the suspended data broadcasting application identified by App_id is resumed from the suspended state. Then, the procedure is returned to step S1 to repeat the above-mentioned processing therefrom.

In step S7, if the decision result in step S4 is found not to be an execute command, then the procedure goes to step S13. In step S13, the control block 68 determines whether the decision result in step S4 is an inject event command. If the decision result is found to be an inject event command, then the procedure goes to step S14.

In step S14, the control block 68 controls the application engine 74 only when App_id of this trigger information matches App_id of the active data broadcasting application, thereby firing (executing) the event corresponding to Event_id of trigger information in the active application. Next, the procedure is returned to step S1 to repeat the above-mentioned processing therefrom.

In step S13, if the decision result in step S4 is found not to be an inject event command, then the procedure goes to step S15. In step S15, the control block 68 determines whether the decision result in step S4 is a suspend command. If the decision result is found to be a suspend command, then the procedure goes to step S16.

In step S16, under the control of the control block 68, the application engine 74 saves the data (namely, the data currently stored in the work memory 75A; if the information to be displayed has a layer structure, this data includes the information indicative of the layer of the displayed information) indicative of the currently active data broadcasting application to the save memory 75B. Then, the procedure is returned to step S1 to repeat the above-mentioned processing therefrom.

In step S15, if the decision result in step S4 is found not to be a suspend command, then the decision result in step S4 should have been a terminate command, so that the procedure goes to step S17. In step S17, under the control of the control block 68, the application engine 74 terminates the data broadcasting application identified by App_id if this data broadcasting application is active. In step S18, under the control of the control block 68, the application engine 74 deletes the data associated with the data broadcasting application identified by App_id from the work memory 75A and the save memory 75B and, at the same time, deletes the program data of the data broadcasting application from the recording block 71 or the cache memory 73. Then, the procedure is returned to step S1 to repeat the above-mentioned processing therefrom.

Here, the description of the trigger information handling processing has been completed. The above-mentioned trigger information handing processing allows the launching of a data broadcasting application, the firing of an event, and terminating the data broadcasting application in conjugation with a television program or a CM. Further, the trigger information handling processing allows the suspension of a data broadcasting application in an active state and the resumption of the suspended data broadcasting application.

In addition, the above-mentioned trigger information handling processing allows the operation of data broadcasting application as illustrated below.

Figure 17:
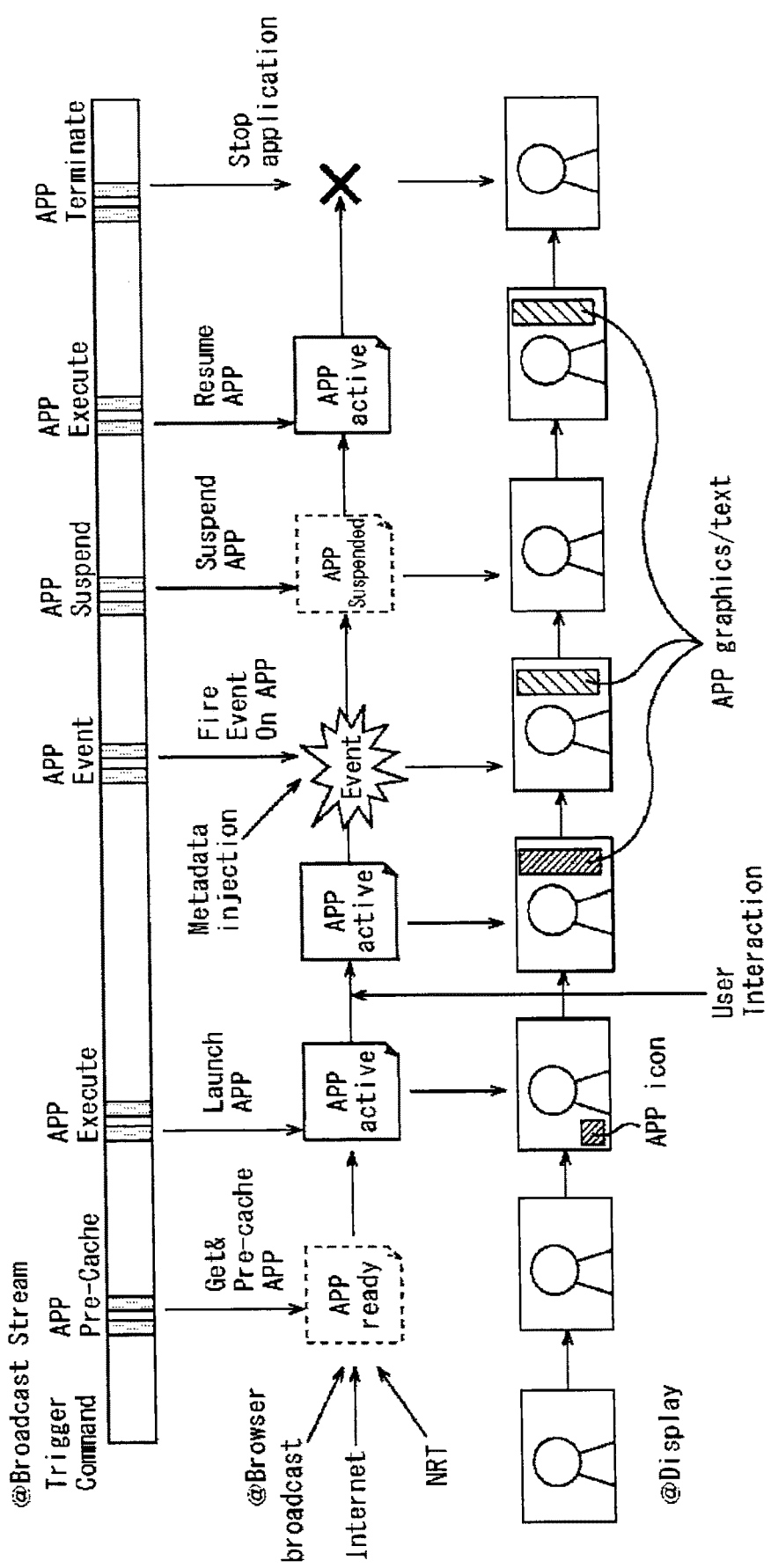
FIG. 17 is a diagram illustrating an exemplary operation scenario of an application program.

Referring to FIG. 17, there is shown one example of an operation scenario of a data broadcasting application.

When the broadcasting apparatus 41 transmits the trigger information of a pre-cache command for specifying the acquisition of the program data for the data broadcasting application corresponding to a program along the progress of a television program to the reception apparatus 60, the reception apparatus 60 obtains the specified program data for the data broadcasting application.

Next, when the broadcasting apparatus 41 transmits the trigger information of an execute command for the data broadcasting application corresponding to the program to the reception apparatus 60, the reception apparatus 60 launches the data broadcasting application. Upon this launching, an icon for prompting the user to display the data broadcasting application is displayed on the video of the program in a superimposed manner.

When the user clicks this icon, the display by the data broadcasting application is superimposed on the screen of the video of the program.

When the broadcasting apparatus 41 transmits the trigger information of an inject event command to the reception apparatus 60 along the progress of the television program, the reception apparatus 60 fires the event in the active data broadcasting application (for example, the display is changed).

Then, when the broadcasting apparatus 41 transmits the trigger information of a suspend command for the data broadcasting application to the reception apparatus 60 with a predetermined timing, the reception apparatus 60 suspends the active data broadcasting application (the associated data is held in the save memory 75B). Next, when the broadcasting apparatus 41 transmits the trigger information of an execute command for the data broadcasting application to the reception apparatus 60, the reception apparatus 60 resumes the suspended data broadcasting application.

Further, when the broadcasting apparatus 41 transmits the trigger information of a terminate command upon the end of the television program to the reception apparatus 60, the reception apparatus 60 terminates the active data broadcasting application.

[Status Transitions of Data Broadcasting Application]

Figure 18:
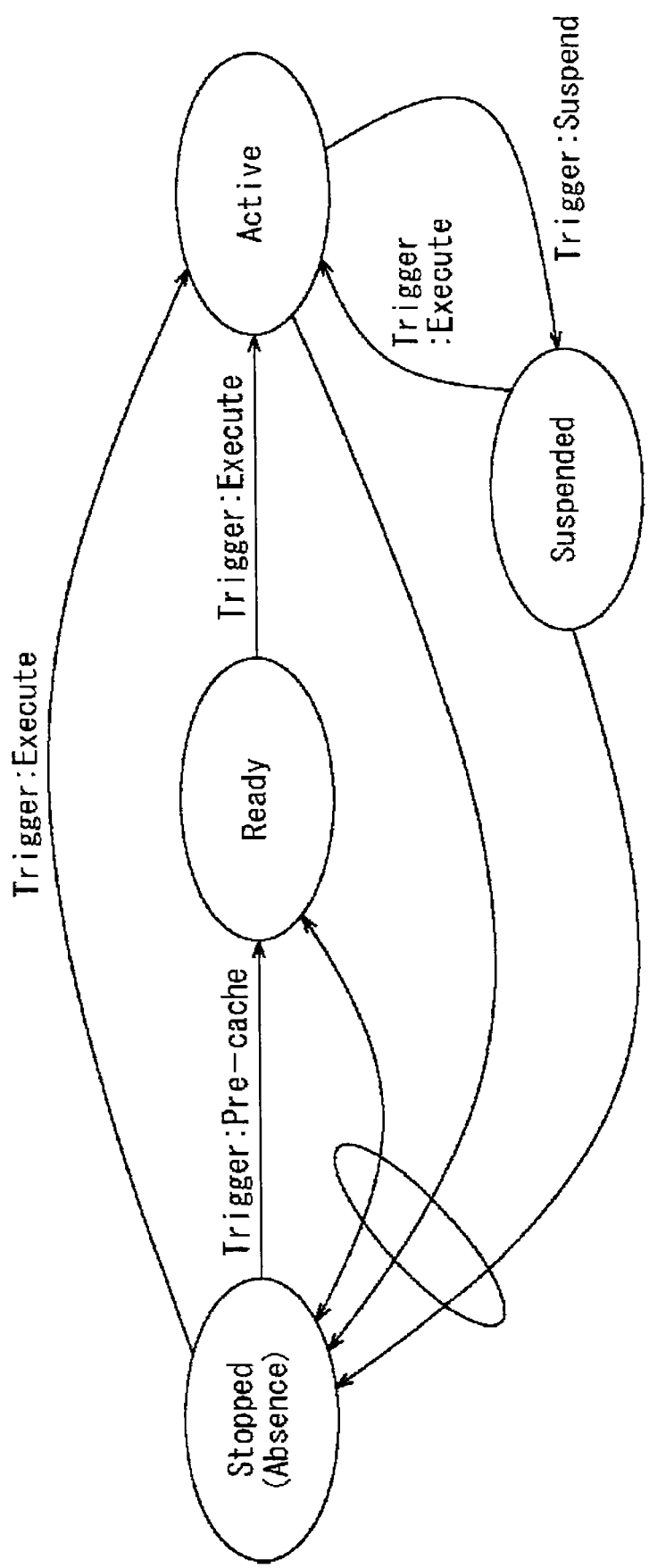
FIG. 18 is a schematic diagram illustrating status transitions of an application program of the reception apparatus.

Now, referring to FIG. 18, there is shown status transitions of a data broadcasting application in the reception apparatus 60.

As shown in FIG. 18, a data broadcasting application transitions to any one of four types of states; a stopped state, a ready state, an active state, and a suspended state.

In the stopped state, a data broadcasting application is not executed and the program data of the data broadcasting application has not been obtained. In the ready state, the program data of the data broadcasting application has already been obtained but the data broadcasting application is not executed. In the active state, the data broadcasting application has been launched and is being executed. In the suspended state, the execution of the data broadcasting application is discontinued and the information indicative of the discontinued state is held in the save memory 75B.

If the trigger information of a pre-cache command has been received with a data broadcasting application transitioned to the stopped state and the program data of the data broadcasting application is obtained, the data broadcasting application transitions to the ready state.

If the trigger information of an execute command has been received with a data broadcasting application transitioned to the stopped state or the ready state and the data broadcasting application is launched, the data broadcasting application transitions to the active state.

If the trigger information of a suspend command has been received with a data broadcasting application transitioned to the active state and the active data broadcasting application is suspended, the data broadcasting application transitions to the suspended state.

If the trigger information of an execute command has been received with the a data broadcasting application transitioned to the suspended state and the suspended data broadcasting application is resumed, the data broadcasting application transitions to active state.

If the trigger information of a terminate command has been received with a data broadcasting application transitioned to a ready state, an active state, or a suspended state, the data broadcasting application in the ready state, the active state, or the suspended state transitions to a stopped state. It should be noted that the transition to a stopped state may take place not only on the basis of the trigger information of a terminate command, but also by the reception channel switching that is executed upon execution of another data broadcasting application after passing of App_expire_date in trigger information.

[Operation Scenario of Access Distribution by use of Trigger_Validity]

The following details a method of distributing the accesses from many active reception apparatuses 60 to the server 46 by properly setting validity probability parameter N to be written to item Trigger_validity in trigger information.

First, the following lists the assumptions for setting proper validity probability parameter N.

The audience rating of each television program that is executed as related with a data broadcasting application can be estimated on the basis of past statistics (the average audience ratio of similar programs). Therefore, the total number of reception apparatuses 60 (hereafter referred to as estimated number of audience terminals Ne) that are viewing a television program concerned can be estimated.

The minimum period of the transmission frequency (or transmission interval) of the trigger information having the same contents (but different valid probabilities) that is transmitted two or more times is assumed to be a length of time necessary for most of the reception apparatuses 60 that have received the trigger information to determine that the received trigger information is valid and then access the server 46. This length of time may be determined to be two seconds for example on the basis of actually measured and empirical values. In what follows, this length of time is referred to as unit time td.

A time range for distributing the accesses to the server 46 (hereafter referred to as a server access interval) is determined by the purpose of each access for each data broadcasting application and defined by two points of time, access start point T0 and access expire point Te. For example, the server access interval of the trigger information of an execute command can be defined to be shorter than the server access interval of the trigger information of a pre-cache command that is transmitted before the execute command.

The maximum value of the number of accesses per unit time td from the reception apparatus 60 to the server 46 (hereafter referred to as a access count target maximum value At) depends on the processing performance of the server. Therefore, the distribution of the accesses to the server 46 requires an operation in which, on a plane including the time axis (or the horizontal axis) and the access count axis (or the vertical axis), a point indicative of an access count of each unit time td falls in a rectangular area defined by the access distribution time defined on the time axis and access count target maximum value At on the access count axis.

Further, if the point indicative of the access count falls in the above-mentioned rectangular area, it is required to satisfy a demand for converging the accesses as early as possible, namely, a demand for shortening the server access interval (policy A) or reducing the access count per unit time td as far as possible (policy B).

It is assumed here that the influence due to the congestion of the Internet 50 caused by other than the accesses to the server 46 by the reception apparatus 60 be not put into consideration.

It is also assumed that all the processing performance of the server 46 be allocated for the handling of the access from the reception apparatus 60, although the server 46 can execute processing other than the processing of handling the access from the reception apparatus 60.

It is further assumed that, if the reception apparatuses 60 access the server 46 with a timing specified by the user, these accesses be distributed equally in terms of time.

The following operation scenarios 1 through 5 are proposed under the assumptions described above.

[First Operation Scenario]

Figure 19:
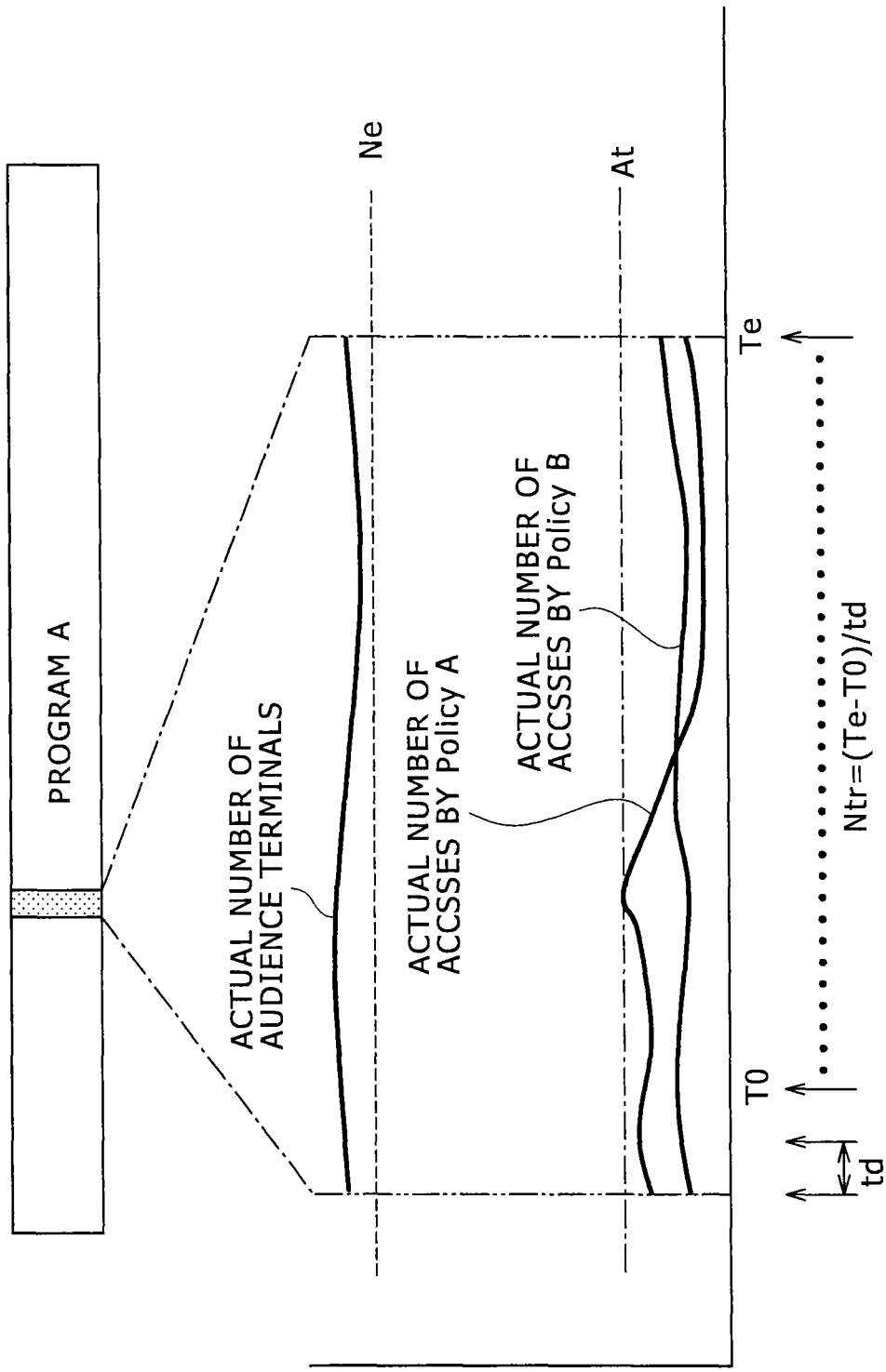
FIG. 19 is a diagram illustrating a first operation scenario.

Now, referring to FIG. 19, there is shown a diagram for describing the first operation scenario. The first operation scenario is intended to obtain and launch a new data broadcasting application halfway in program A.

The first operation scenario assumes that almost the total number of reception apparatuses 60 viewing program A do not change in an access distributed time for obtaining a data broadcasting application. In this case, the total number Ne of the reception apparatuses 60 viewing program A is estimated from the estimated audience rating (based on past statistics for example) of program A.

Here, let unit time be td, access count target maximum value of the server 46 be At, and server access interval be (Te−T0), then the number of trigger information Ntr having the same contents that can be transmitted during a server access interval is equal to (Te−T0)/td. Therefore, the total number of accesses that can be handled by the server 46 in a server access interval is At·Ntr.

If At·Ntr is less than estimated number of audience terminals Ne (Ne>At·Ntr), then the server access interval must be extended or access count target maximum value At must be set higher.

If policy A that converges the access to the server 46 as early as possible is employed, validity probability parameter N=P1 of item Trigger_validity in the trigger information to be first transmitted is set to P1=Ne/At (an integer value obtained by rounding up) so that the accesses from the reception apparatuses 60 equal to the estimated number of audience terminals Ne are held down to access count target maximum value At. Validity probability parameter N=Pk of item Trigger_validity in the trigger information to be transmitted k-th time (k being an integer of 2 or higher) is set to Pk=(Ne−(k−1)At)/At=P1−(k−1). If Pk goes equal to or below 1, Pk is set to 1 thereafter.

In order to employ policy B that reduces the number of accesses per unit time td as much as possible, estimated number of audience terminals Ne is equally divided by trigger count Ntr=(Te−T0)/Td and validity probability parameter N of item Trigger_validity in the trigger information to be first transmitted is set to P1=Ntr. Validity probability parameter N=Pk of item Trigger_validity in the trigger information to be transmitted k-th time (k being an integer of 2 or higher) is set to Pk≈Nt−(k−1).

[Second Operation Scenario]

Figure 20:
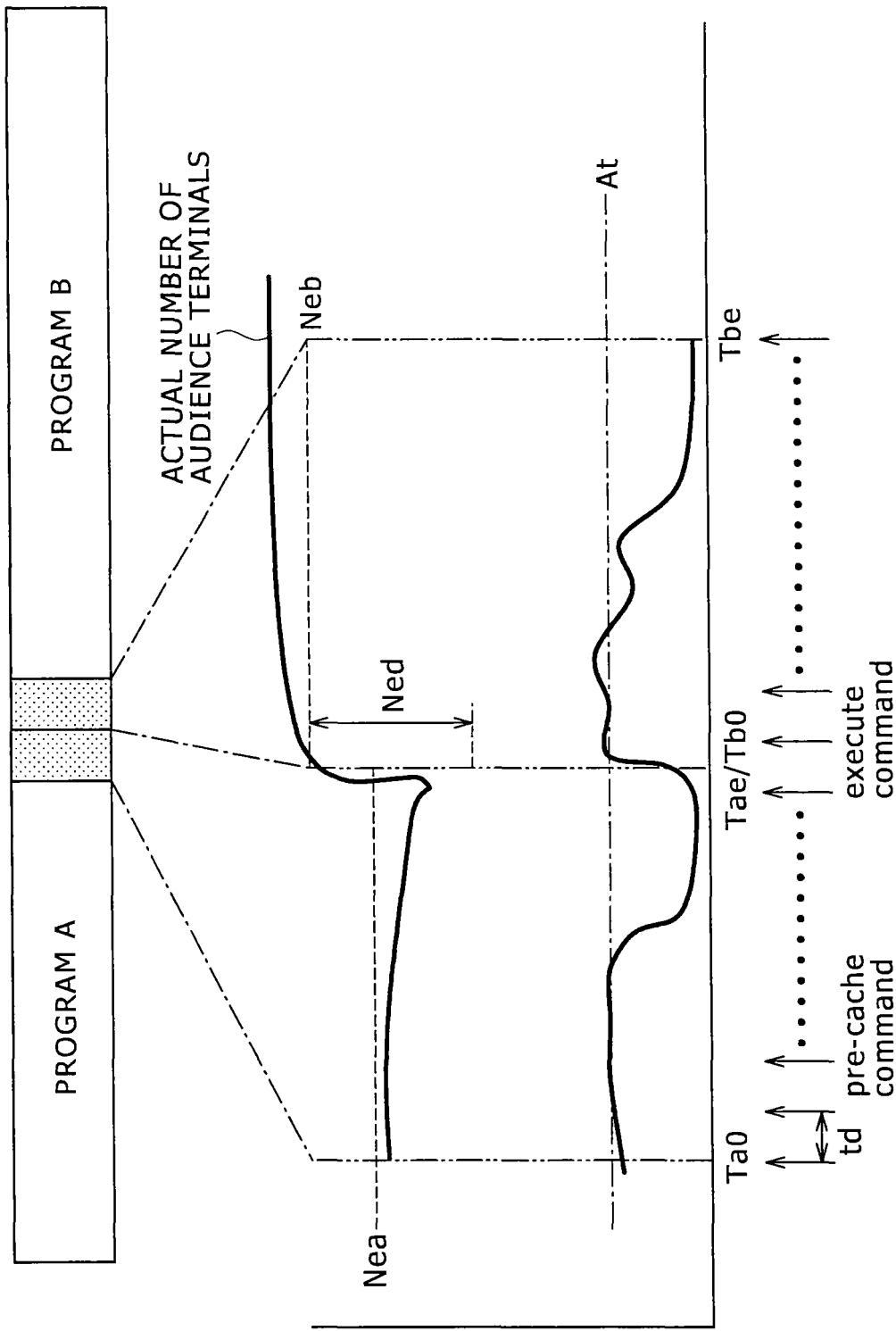
FIG. 20 is a diagram illustrating a second operation scenario.

Referring to FIG. 20, there is shown a diagram for describing the second operation scenario. The second scenario is intended distribute the accesses to the server 46 from the last half of program A to the first half of program B by starting the acquisition of a data broadcasting application corresponding to program B before the start thereof, namely, during the broadcasting of program A in the same channel, thereby launching the data broadcasting application upon the start of program B. To be more specific, the trigger information that is a pre-cache command is transmitted during the broadcasting of program A and the trigger information that is an execute command is transmitted at the start of program B.

The second operation scenario takes into consideration that there are reception apparatuses 60 that do not view program B continuously from program A and there are reception apparatuses 60 that view program B by selecting this channel from another channel. Namely, the estimation is made by letting the total number of reception apparatuses 60 viewing program A be estimated number of audience terminals Nea, the total number of reception apparatuses 60 viewing program B be estimated number of audience terminals Neb, and the total number of reception apparatuses 60 that select this channel from another channel to start viewing program B be estimated number of additional audience terminals be Ned.

If policy A is employed that shortens, as much as possible, the server access interval (from Ta0 to Tae) in which program A is being broadcast, substantially the same manner as that of the first scenario described above is executed. Namely, validity probability parameter N=P1 of item Trigger_validity in the trigger information that is a pre-cache command to be first transmitted in program A is set to P1=Nea/At (an integer value obtained by rounding up) so that the accesses from the reception apparatuses 60 equal to the estimated number of audience terminals Ne are held down to access count target maximum value At. Validity probability parameter N of item Trigger_validity in the trigger information to be transmitted k-th time (k being an integer of 2 or higher) is set to Pk=(Nea−(k−1)At)/At÷P1−(k−1). If Pk goes equal to or below 1, Pk is set to 1 thereafter.

After the start of program B, the accesses by the reception apparatuses 60 equal to estimated number of additional audience terminals Ned that select this channel from another channel to start viewing program B may be distributed, so that validity probability parameter N=P1 of item Trigger_validity in the trigger information that is an execute command to be first transmitted in program B is set to P1=Ned/At (an integer value obtained by rounding up). Validity probability parameter N of item Trigger_validity in the trigger information to be transmitted k-th time (k being an integer of 2 or higher) is set to Pk=(Ned−(k−1)At)/At=P1−(k−1). If Pk goes equal to or below 1, Pk is set to 1 thereafter.

[Third Operation Scenario]

Figure 21:
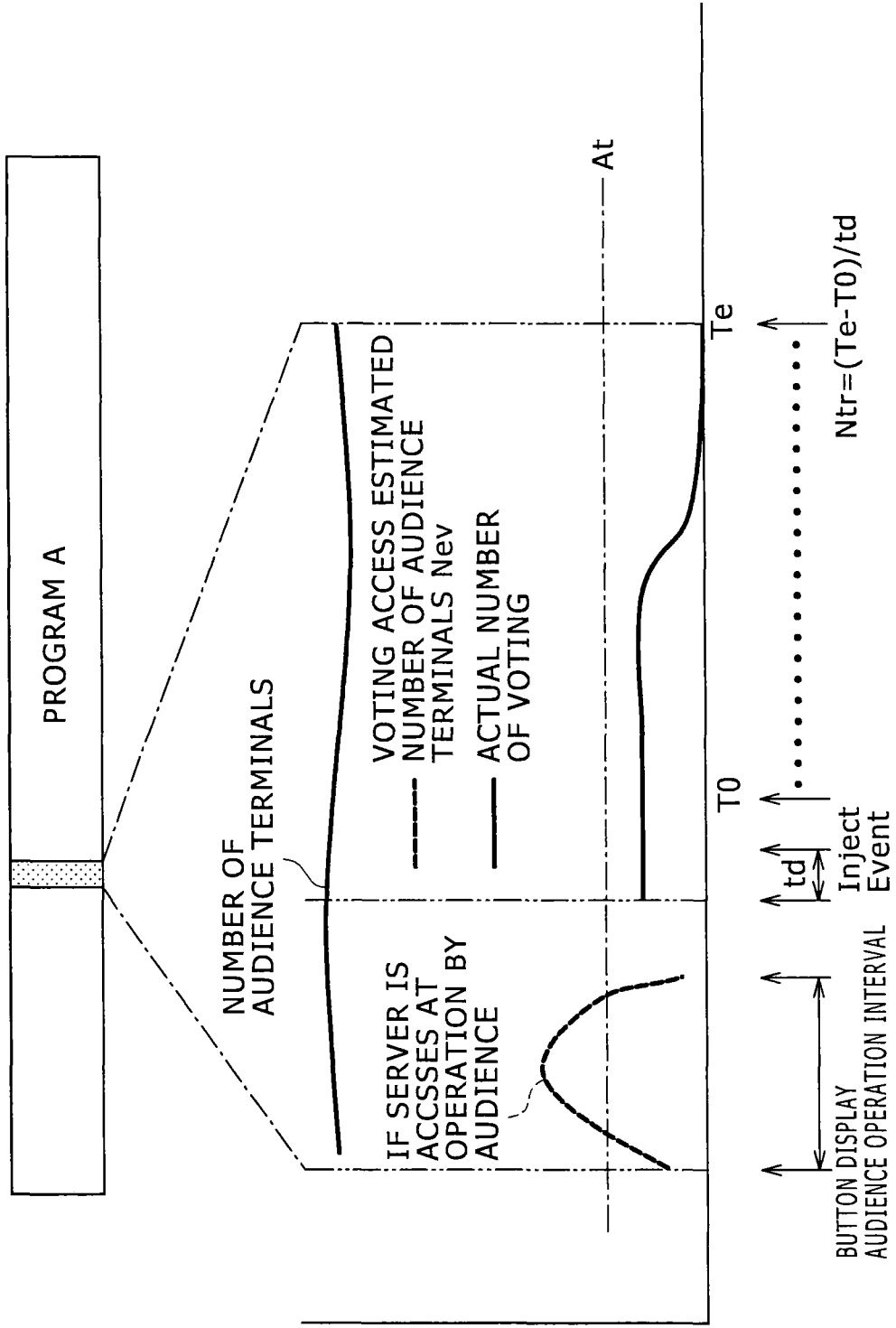
FIG. 21 is a diagram illustrating a third operation scenario.

Referring to FIG. 21, there is shown a diagram illustrating the third operation scenario. The third scenario is intended to execute, by use of a data broadcasting application, a voluntary audience voting in a predetermined time zone during which program A is broadcast and collect the results of the voting by the server 46. To be more specific, by use of a data broadcasting application, a voting button for example is displayed in conjugation with the progress of program A and the audience is made press the displayed button. It should be noted that the voting results are not supplied to the server 46 immediately after the pressing of the button, but the results are supplied to the server 46 in a temporally distributed manner as an event firing made in response to the trigger information that is an inject event command.

Therefore, with the third operation scenario, proper validity probability parameter N may be specified to Trigger_validity in the trigger information that is an inject event command.

However, because the above-mentioned voting is executed on an audience voluntary basis, it is difficult to predict, with a high accuracy, estimated number of audience terminals Nev that is the total number of reception apparatuses 60 accessing the server 46. So, in the third operation scenario, policy B that reduces the number of accesses per unit time td as much as possible is employed. To be more specific, estimated number of audience terminals Nev is equally divided by the number of triggers Ntr=(Te−T0)/Td and validity probability parameter N of item Trigger_validity in the trigger information that is an inject event command to be first transmitted is set to P1=Ntr. Validity probability parameter N of item Trigger_validity in the trigger information to be transmitted k-th time (k being an integer of 2 or higher) is set to Pk≈Nt−(k−1).

[Fourth Operation Scenario]

Figure 22:
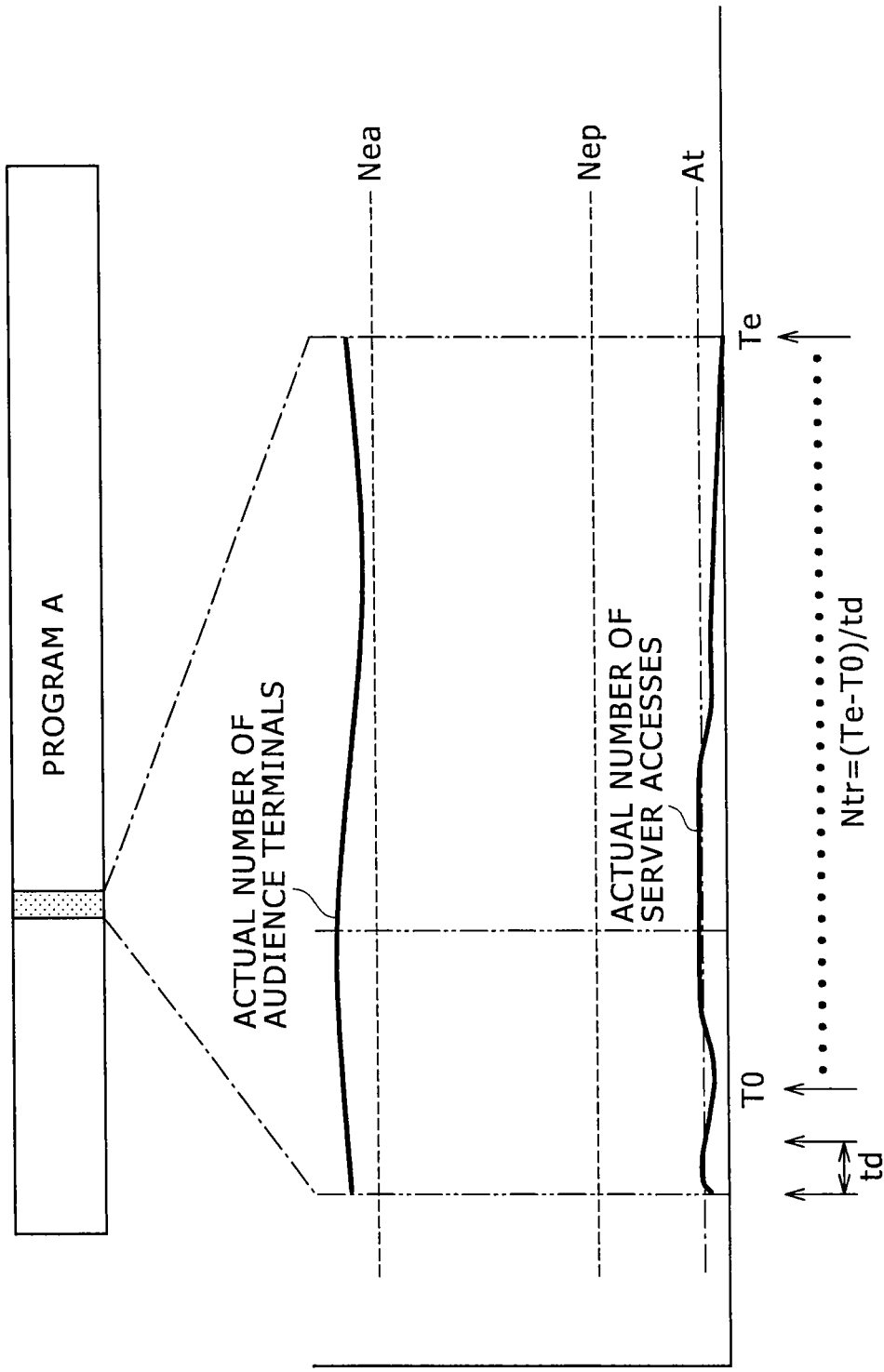
FIG. 22 is a diagram illustrating a fourth operation scenario.

Referring to FIG. 22, there is shown a diagram for describing the fourth operation scenario. The fourth operation scenario is intended, by use of a data broadcasting application, to cause a predetermined number of reception apparatuses 60 that are randomly extracted (actually, each reception apparatus 60 randomly determines on the basis of the validity probability) from all of the reception apparatuses 60 receiving program A to supply user profile information to the server 46 as a data broadcasting application event.

As described above, letting only a particular ratio of all the reception apparatuses 60 receiving program A access the server 46 allows the acquisition of such statistical information as audience profile trends without imposing much load on the server 46.

To be more specific, above-mentioned estimated number of audience terminals Ne in the first operation scenario may be replaced by access target count Nep obtained by multiplying estimated number of audience terminals Ne by a predetermined ratio.

Namely, if policy A for converging the accesses to the server 46 as early as possible, validity probability parameter N of item Trigger_validity in the trigger information that is an inject event command to be first transmitted is set to P1=Nep/At (an integer value obtained by rounding up). Validity probability parameter N of item Trigger_validity in the trigger information to be transmitted k-th time (k being an integer of 2 or higher) is set to Pk=(Nep−(k−1)At/At=P1−(k−1). If Pk goes equal to or below 1, Pk is set to 1 thereafter.

[Fifth Operation Scenario]

Figure 23:
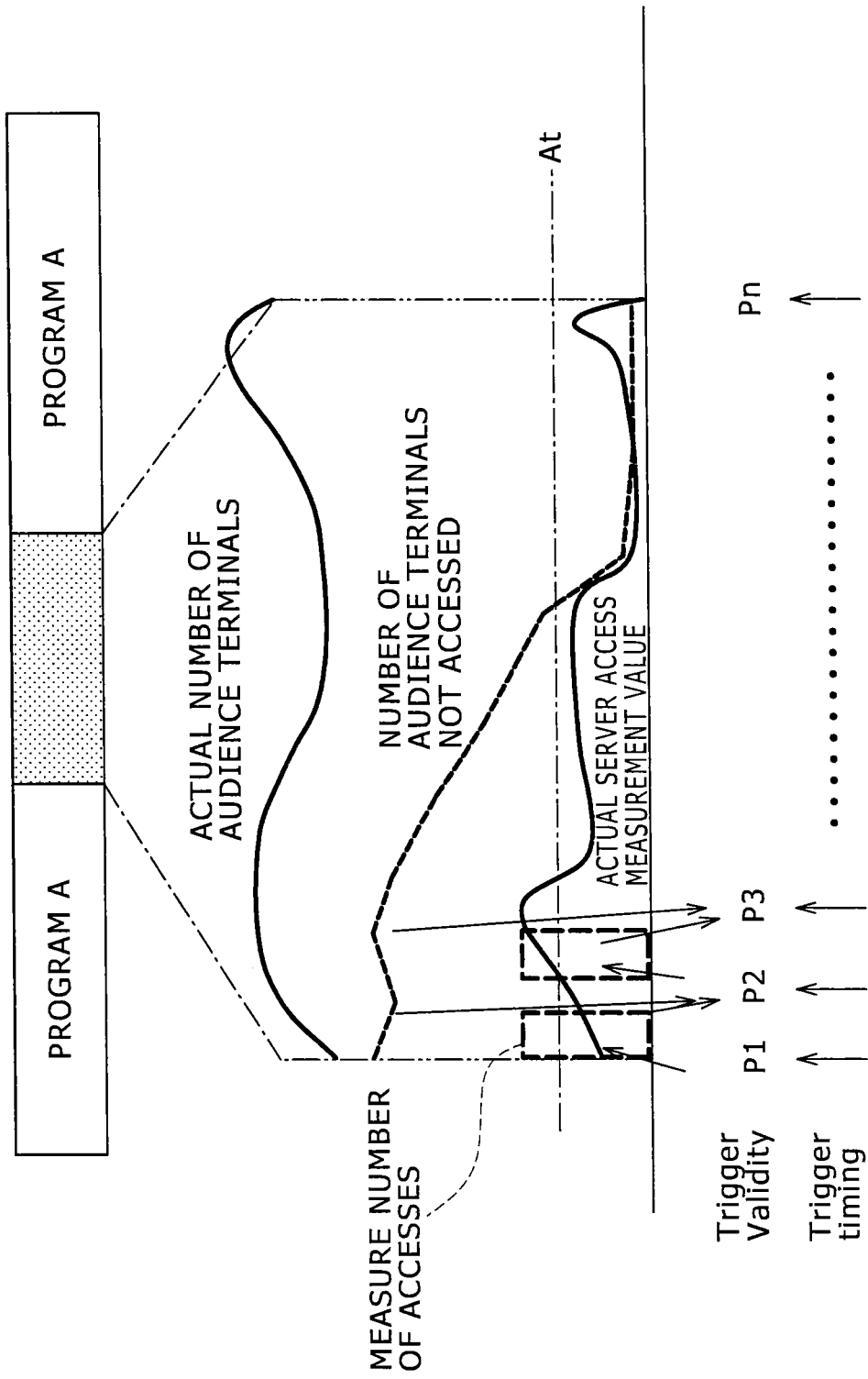
FIG. 23 is a diagram illustrating a fifth operation scenario.

Referring to FIG. 23, there is shown a diagram for describing the fifth operation scenario. In the first scenario through the fourth scenario described above, the total number of reception apparatuses 60 receiving a program is estimated on the basis of past statistics for example. By contrast, the fifth operation scenario actually measures the number of accesses made from the reception apparatuses 60 that responded to the first trigger information to the server 46 and computes the total number of reception apparatuses 60 on the basis of the obtained actual measurements. Therefore, the total number of reception apparatuses 60 receiving a program can be grasped comparatively correctly, so that validity probability parameter N of item Trigger_validity in the second and subsequent trigger information can be set to more proper values.

To be more specific, for the trigger information to be first transmitted, validity probability parameter N=P1 is computed on the basis of estimated number of audience terminals Ne in substantially the same manner as that of the first operation scenario described above. Then, the number of accesses al from the according reception apparatuses 60 is measured to compute the highly accurate estimated number of reception apparatuses 60 receiving program A as P1·al.

For the trigger information to be transmitted second time and later, the actual number of accesses is subtracted from highly accurate estimated value P1·al of the reception apparatuses 60 receiving program A to compute with high accuracy the number of reception apparatuses 60 not accessing, thereby computing validity probability parameter N=Pk (k being 2 or higher) as shown in the following equation:

$$Pk=(P1\cdot al - \Sigma ai) \times c(a(k-1)-At)/At$$

where, c is a coefficient to be multiplied by a difference from access count maximum value At as a feedback element if the number of accesses goes up or down access count target maximum value At.

As described above, properly setting validity probability parameter N of item Trigger_validity in trigger information allows the temporal distribution of the accesses from the reception apparatus 60 to the server 46. Especially, employment of the fifth operation scenario described above allows the more accurate estimation of the total number of reception apparatuses 60 receiving a program, so that the accesses from the reception apparatus 60 to the server 46 can be distributed more properly.

The above-mentioned sequence of processing operations may be executed by software as well as hardware. When the above-mentioned sequence of processing operations is executed by software, the programs constituting the software are installed in a computer which is built in dedicated hardware equipment or installed, from a program recording media, into a general-purpose personal computer for example in which various programs may be installed for the execution of various functions.

Referring to FIG. 24, there is shown a block diagram of an exemplary hardware configuration of a computer by which the above-mentioned sequence of processing operations are executed.

In this computer 100, a CPU (Central Processing Unit) 101, a ROM (Read Only Memory) 102, and a RAM (Random Access Memory) 103 are interconnected by a bus 104.

The bus 104 is connected to an input/output interface 105. The input/output interface 105 is connected to an input block 106 made up of a keyboard, a mouse, a microphone, and so on, an output block 107 made up of a display monitor, a loudspeaker, and so on, a storage block 108 based on a hard disk unit or a nonvolatile memory, a communication block 109 based on a network interface and so on, and a drive 110 configured to drive a removable media 111 such as a magnetic disk, an optical disk, a magneto-optical disk, or a semiconductor memory.

In the computer configured as described above, the CPU 101 loads a program stored in the storage block 108 into the RAM 103 via the input/output interface 105 and the bus 104 to run the loaded program, thereby executing the above-mentioned sequence of processing operations.

It should be noted that the program to be run by the computer may execute the processing operations in a time dependent manner in the sequence described herein, in parallel, or as on an on-demand basis.

It should also be noted that each program may be run by one unit of computer or by two or more units of computers in a distributed manner. Further, each program may be transferred to a remote computer and run thereon.

It should also be noted that term "system" as used herein denotes an entire apparatus configured by a plurality of component units.

While preferred embodiments of the present invention have been described using specific terms, such description is for illustrative purpose, and it is to be understood that changes and variations may be made without departing from the spirit or scope of the following claims.

What is claimed is:

1. A reception apparatus, comprising:
    circuitry configured to
        receive at least one of multiple instances of data acquisition information including validity information and location information to access data on a server, wherein the multiple instances of the data acquisition information are transmitted via a broadcast signal with audio/video content and each of the multiple instances includes the same location information,
        determine whether or not to access the data on the server based on the validity information included in the received at least one of the multiple instances of the data acquisition information, and
        retrieve the data from the server based on the location information included in the received at least one of the multiple instances of the data acquisition information when the data on the server is determined to be accessed based on the validity information included in the at least one of the multiple instances of the data acquisition information.

2. The reception apparatus according to claim 1, wherein the data retrieved from the server is an application program.

3. The reception apparatus according to claim 1, wherein the location information corresponds to a URL to access the data.

4. The reception apparatus according to claim 1, wherein each of the multiple instances of the data acquisition information includes same validity information.

5. The reception apparatus according to claim 1, wherein each of the multiple instances of the data acquisition information includes different validity information.

6. A method for retrieving data, the method comprising:
    receiving, by circuitry of a reception apparatus, at least one of multiple instances of data acquisition information including validity information and location information to access the data on a server, wherein the multiple instances of the data acquisition information are transmitted via a broadcast signal with audio/video content and each of the multiple instances includes the same location information;
    determining, by the circuitry, whether or not to access the data on the server based on the validity information included in the received at least one of the multiple instances of the data acquisition information; and
    retrieving, by the circuitry, the data from the server based on the location information included in the received at least one of the multiple instances of the data acquisition information when the data on the server is determined to be accessed based on the validity information included in the at least one of the multiple instances of the data acquisition information.

7. The method according to claim 6, wherein the data retrieved from the server is an application program.

8. The method according to claim 6, wherein the location information corresponds to a URL to access the data.

9. The method according to claim 6, wherein each of the multiple instances of the data acquisition information includes same validity information.

10. The method according to claim 6, wherein each of the multiple instances of the data acquisition information includes different validity information.

11. A non-transitory computer-readable medium storing a program which when executed by a computer causes the computer to perform a method for retrieving data, the method comprising:
    receiving at least one of multiple instances of data acquisition information including validity information and location information to access the data on a server, wherein the multiple instances of the data acquisition information are transmitted via a broadcast signal with audio/video content and each of the multiple instances includes the same location information;
    determining whether or not to access the data on the server based on the validity information included in the received at least one of the multiple instances of the data acquisition information; and
    retrieving the data from the server based on the location information included in the received at least one of the multiple instances of the data acquisition information when the data on the server is determined to be accessed based on the validity information included in the at least one of the multiple instances of the data acquisition information.

12. The reception apparatus according to claim 1, wherein the circuitry is configured to receive a broadcast signal including the at least one of the multiple instances of the data acquisition information.

13. The method according to claim 6, further comprising:
    receiving a broadcast signal including the at least one of the multiple instances of the data acquisition information.

14. The non-transitory computer-readable medium according to claim 11, the method further comprising:
    receiving a broadcast signal including the at least one of the multiple instances of the data acquisition information.

15. The reception apparatus according to claim 1, wherein the validity information is an integer value.

16. The reception apparatus according to claim 1, wherein the multiple instances of the data acquisition information are encoded within same lines of a plurality of different video frames of the audio/video content.

17. The reception apparatus according to claim 16, wherein the circuitry is configured to determine whether or not to access the data based on the lines of at least two of the plurality of different video frames of the audio/video content in which the multiple instances of the data acquisition information is encoded.

* * * * *